(12) United States Patent
Itabashi et al.

(10) Patent No.: US 6,291,955 B1
(45) Date of Patent: Sep. 18, 2001

(54) MOTOR DRIVE CONTROL WITH LOW CURRENT LIMITATION VALUE

(75) Inventors: Toru Itabashi, Anjo; Hideo Wakata, Nagoya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/523,288

(22) Filed: Mar. 10, 2000

(30) Foreign Application Priority Data

Mar. 16, 1999 (JP) .................................................. 11-070495

(51) Int. Cl.$^7$ .............................. F02D 41/22; F02D 11/10
(52) U.S. Cl. .......................... 318/434; 318/563; 318/626
(58) Field of Search ................................. 318/432, 433, 318/434, 563, 566, 599, 626, 652; 123/319, 361, 376; 180/170, 178, 179

(56) References Cited

U.S. PATENT DOCUMENTS

| | | | |
|---|---|---|---|
| 3,700,996 | * 10/1972 | Gutting | 318/696 |
| 5,092,298 | * 3/1992 | Suzuki et al. | 123/361 |
| 5,638,277 | * 6/1997 | Nagai . | |
| 5,676,217 | * 10/1997 | Torii et al. | 180/179 |
| 5,712,550 | 1/1998 | Boll et al. . | |

FOREIGN PATENT DOCUMENTS 63-99794  5/1988  (JP) .

* cited by examiner

Primary Examiner—Bentsu Ro
(74) Attorney, Agent, or Firm—Nixon & Vanderhye P.C.

(57) ABSTRACT

A microcomputer receives a position detection signal from a throttle angle sensor, and produces drive command signals to a drive circuit to control the position of a throttle valve to a target position through a motor. The current supplied to the motor is limited to less than a maximum value in a current variation zone in a normal motor operation range, when the throttle valve cannot be controlled to the target position, that is, when it is locked to the same position. The microcomputer produces a signal to cancel the current limitation to the motor, when it detects from the position detection signal of the throttle angle sensor that the throttle valve undergoes a predetermined change under the current limitation condition.

10 Claims, 15 Drawing Sheets

NORMAL OPERATION

MOTOR DRIVE CONTROL WITH LOW CURRENT LIMITATION VALUE

CROSS REFERENCE TO RELATED APPLICATION

This application relates to and incorporates herein by reference Japanese Patent Application No. 11-70495 filed on Mar. 16, 1999.

BACKGROUND OF THE INVENTION

The present invention relates to a motor drive control which is applicable to, for instance, an electronic throttle control apparatus for vehicles for driving a throttle valve disposed in an engine intake pipe by a direct current motor in accordance with a pedal stroke of an accelerator pedal and the like.

U.S. Pat. No. 5,712,550 (Japanese PCT Laid-open Publication JP-A-9-501817) teaches, as shown in FIG. 16, an electronic throttle control apparatus which drives a motor M by an H-bridge drive circuit using four switching transistors Q1–Q4 and executes a current limitation while ensuring responsiveness of a valve to be driven. In this apparatus, the motor is supplied with a current of 100% duty at the time of motor drive initiation to speed up the valve operation, and is supplied with a current in a reverse direction at the time of approaching to a target valve position to brake the valve operation.

The currents for the motor drive initiation and for braking are subjected to current limitations. With this current limitation, output loss required to drive devices Q1–Q4 such as power MOSFETs or the like in the H-bridge circuit is reduced. It becomes possible to construct the drive circuit with drive devices of small rating and in low cost. It is to be noted that FIG. 16 shows a case in which a drive logic circuit 100 receives drive command signals A1–A4 from a control circuit 101 and executes a current limitation processing in response to a current detection signal from a current detection circuit 102.

On the other hand, a certain limited current is continued to be supplied for a fixed time period even under a motor lock condition, so that the operation restores from a light lock condition where the valve cannot be controlled to a target position and stays at substantially the same position. This light lock condition may occur from freezing (icing) of water remaining on the valve.

Specifically, as shown in FIG. 17, the limit of the current supplied to the motor is switched to a low value Ilimit(L) (<Ilimit(H)), when a motor lock occurs during a period of limiting a motor current IM to the current limitation value Ilimit(H) at the time of motor drive initiation or braking. The motor lock is detected when the current limitation continues for a predetermined time period. The current is continued to be supplied, when the motor current IM enters a normal current zone Znor within the predetermined time period T2 as shown by (I) in FIG. 17, that is, when the lock condition disappears and normal operation restores.

The motor current supply is interrupted, when the motor current IM does not enter the normal current zone Znor after the predetermined time period T2 as shown by (II) in FIG. 17. The current limitation may be executed by detecting the motor current IM and interrupting the current supply temporarily when the detected current IM reaches the current limitation value.

Thus, the drive device can be sized small and cost can be reduced by reducing the current under the lock condition.

In the above apparatus, however, the restoration from the current limitation condition under the lock condition is determined from the restoration of the motor current IM to the normal current zone Znor, that is, when the current decreases to less than a maximum value InorMAX of the normal current zone. Therefore, the current limitation value Ilimit (L) under the lock condition need be set to a larger value relative to the normal current zone Znor, and hence the drive devices are required to be sized large to meet this current limitation condition.

More specifically, in setting the current limitation value Ilimit(L) under the lock condition, it must be taken into consideration that the current limitation operation is executed properly relative to the current normal condition of a feedback control for a target opening angle including a holding of the valve opening angle but excluding the current supply for the motor drive initiation or braking. Tolerances in manufacture of the current detection circuit and motor coils must be considered. For this reason, the current limitation value Ilimit(L) must be set to a sufficiently large value.

It is thus necessary to set the current limitation value Ilimit(L) to a larger value for the current limitation operation, when the release from the lock condition is determined from a change in the motor current (entering into the normal current zone Znor). That is, the current value does not necessarily decrease below the limitation value Ilimit(L) even when released from the lock condition, if the current limitation value Ilimit(L) is set to the maximum value InorMAX of the normal current zone Znor. Therefore, it is impossible to determine the release from the lock condition based on the change in the current value.

The drive device is required to withstand the lock-time current for the fixed time period. The output loss of the drive device increases in comparison with the case of drive current supply under the normal condition, if the value Ilimit(L) is set to be sufficiently larger than the value InorMAX. As a result, the drive device must be an expensive component which has a large rating or has a large chip size with a small on-resistance. Further, the motor must be designed on an assumption that a large torque will be applied in excess of the normal drive torque, resulting in a cost increase.

SUMMARY OF THE INVENTION

It is therefore an object of the present invention to provide a motor drive apparatus having a current limitation function which is capable of determining a release from a lock condition and reducing a current limitation value at the time of motor lock.

According to the present invention, a current supplied to a motor is limited not to exceed a predetermined value within a current variation zone in a normal operation range of the motor relative to a lock condition where a driven object cannot be controlled to a target position and continues to stay at substantially the same position. Further, based on a position detection signal indicative of the driven object or a drive command signal, the current limitation against the motor is cancelled under the current limitation condition.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

Embodiments of the present invention will be described below with reference to the drawings. The present invention is applied to an electronic throttle control apparatus in the following embodiments.

First Embodiment

The present embodiments are applied to a system in which a direct current motor has a sufficient torque. Further, the motor is initiated and braked by limiting a current supplied to the motor during the current supply for a motor drive initiation or braking by a high current value Ilimit(H) which does not lessen the motor drive initiation performance or braking performance. The limitation value of the current supplied to the direct current motor is switched to a lower current value Ilimit(L) after an elapse of the period when the motor lock is likely to occur.

Figure 1:
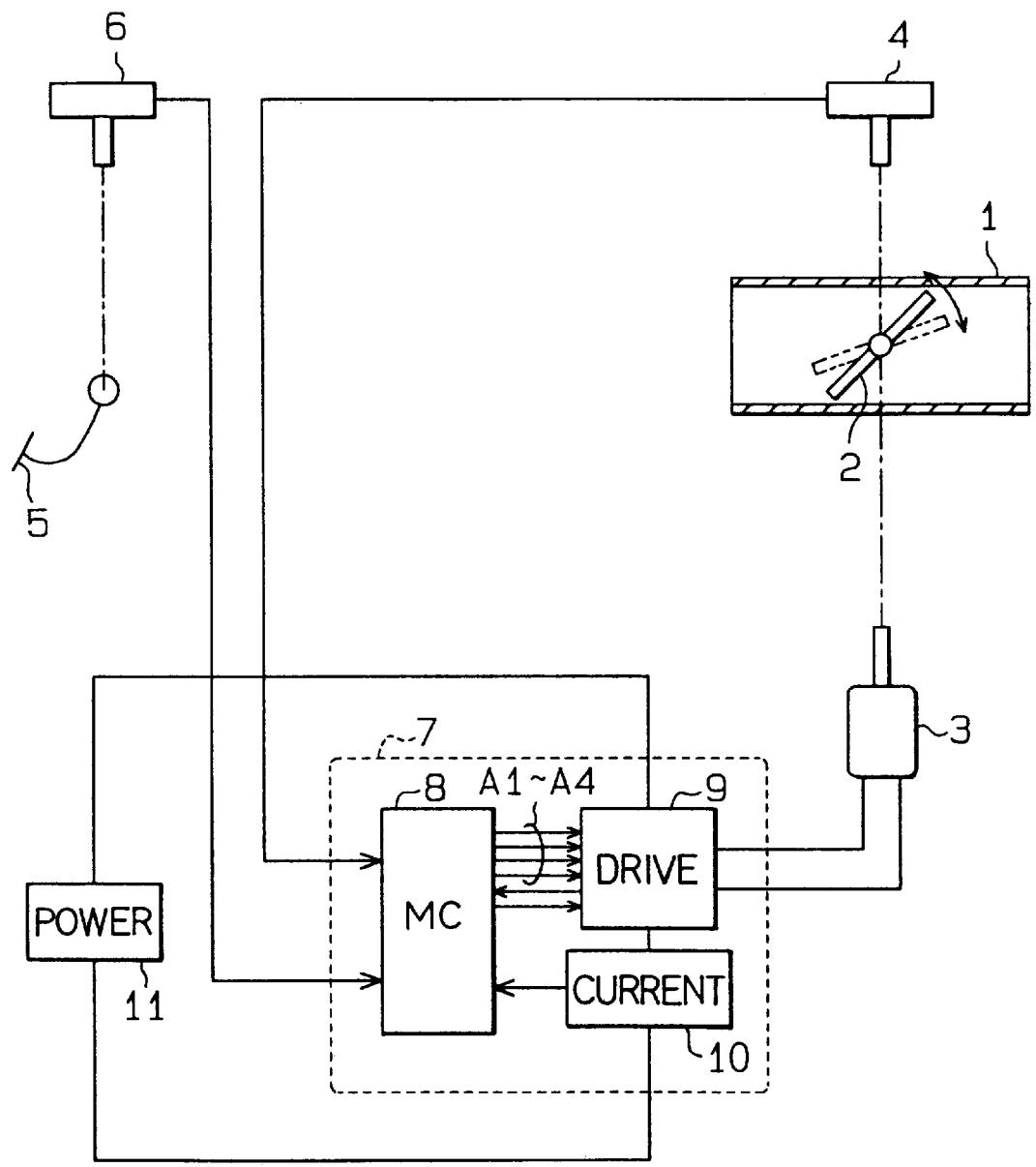
FIG. 1 is a block diagram showing an entire electronic throttle system according to a first embodiment of the present invention.

The entire system construction is described first with reference to FIG. 1. A throttle valve 2 is provided in an engine intake pipe 1 and supported rotatably in an opening and closing directions. The throttle valve 2 is biased in the valve direction by a return spring (not shown). The throttle valve 2 is coupled to an output shaft of a direct current motor 3 so that the throttle valve 2 is driven by the direct current motor 3 against the biasing force of the return spring.

More specifically, the throttle valve 2 is forced by the return spring to return to a substantially closed position which enables an engine idling operation. The direct current motor 3 applies a torque to drive the throttle valve 2 in the valve opening direction against the biasing force of the return spring. The current supplied to the direct current motor 3 is increased to produce a required torque at the time of a motor in driving the direct current motor 3.

The opening angle of the throttle valve 2 is detected by a throttle angle sensor 4. The pedal stroke of an accelerator pedal 5 controlled by a vehicle driver is detected by an accelerator sensor 6.

The system has an electronic control unit 7 which controls the opening angle of the throttle valve 2 as well as an ignition timing and a fuel injection quantity. The electronic control unit 7 has a microcomputer 8, a motor drive circuit 9 and a current detection circuit 10. The microcomputer 8 receives an angle detection signal of the throttle valve 2 from the throttle angle sensor 4 and a pedal stroke detection signal if the accelerator pedal 5 from the accelerator sensor 6. The microcomputer 8 receives a temperature detection signal of an engine coolant in addition to the above sensor signals.

The microcomputer 8 produces drive command signals A1–A4 to the motor drive circuit 9 in response to the received accelerator pedal stroke. The motor drive circuit 9 is in the H-bridge type to drive the direct current motor 3 and connected to a power source (vehicle-mounted battery) 11. The motor drive circuit 9 receives four drive command signal A1–A4 from the microcomputer 8 and supplies current to the motor 3 to drive the throttle valve 2 to a target throttle angle set in accordance with the accelerator pedal stroke. The current detection circuit 10 detects the current supplied to the direct current motor 3.

The drive circuit 9 limits the current supplied to the direct current motor 3 not to exceed a current limitation value Ilimit(H) in predetermined time periods corresponding to the motor drive initiation and braking. It limits the current not to exceed a lower current value Ilimit(L) when the above current limitation continues for a predetermined time period. Therefore, the current supplied to the direct current motor 3 is limited to the current limitation value Ilimit(L) when a motor lock is occurring. This current limitation is released when the motor lock disappears during the current limitation operation with the current limitation value Ilimit(L). However, the microcomputer 8 changes all the drive signals A1–A4 to the L-level (low level) to interrupt the current supply to the direct current motor 3, when the opening angle of the throttle valve 2 does not approach the target throttle angle after the predetermined time period.

Figure 17:
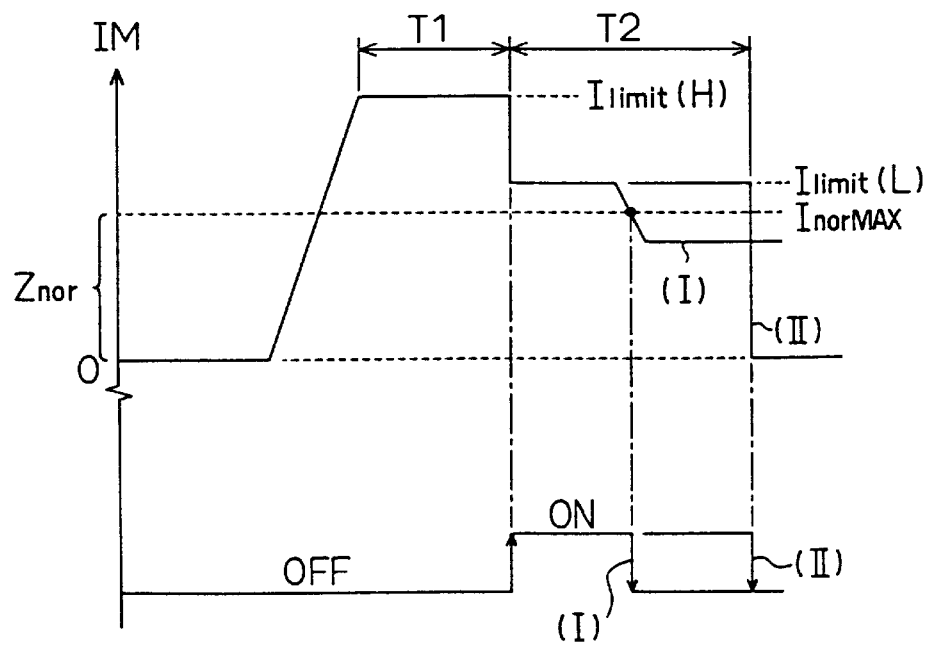
FIG. 17 is a timing diagram showing an operation of the conventional apparatus under the motor lock condition.

Here, the current limitation value Ilimit(L) is in the current variation zone in the normal operation range of the motor 3 (normal current zone Znor in FIG. 17). More specifically, it is set to a maximum value InorMAX in the normal current zone Znor in FIG. 17. As described above, the current supplied to the motor 3 is limited not to exceed the predetermined value InorMAX in the current variation zone Znor in the motor normal operation range under the lock condition where the throttle valve 2 cannot be controlled to the target position and stays at substantially the same position.

Figure 2:
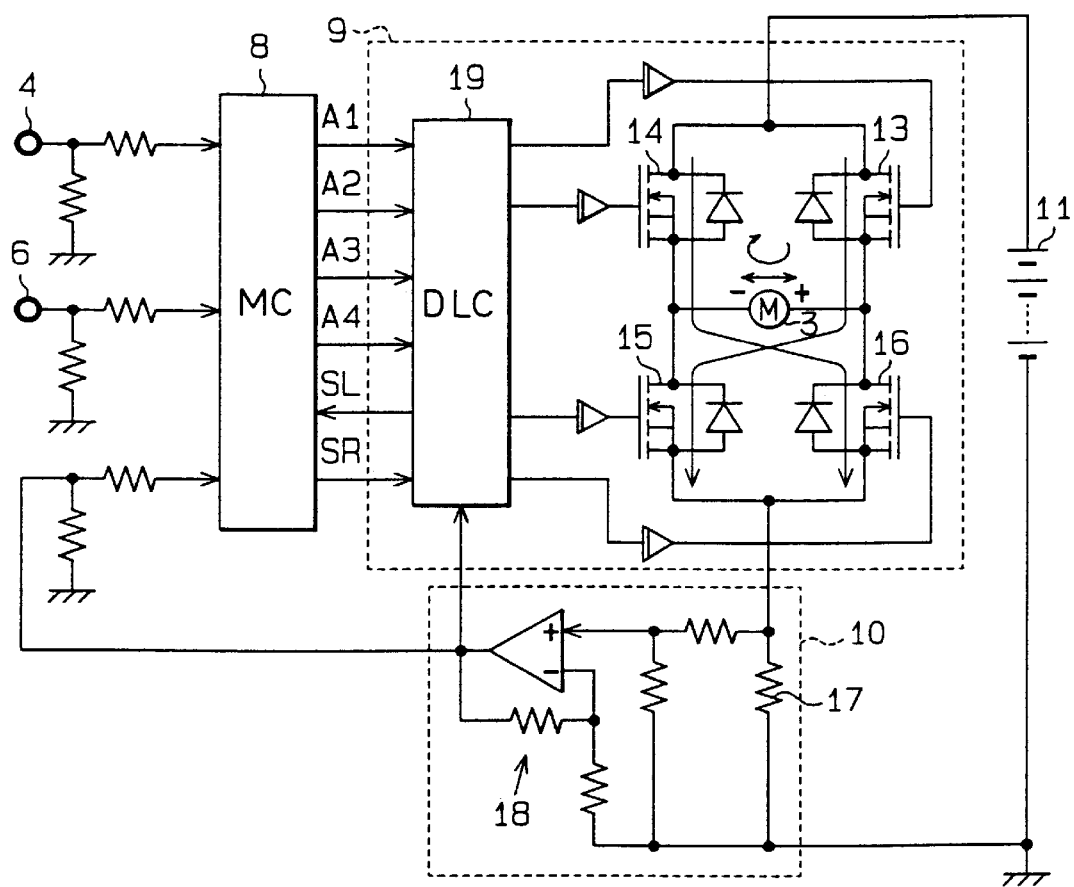
FIG. 2 is an electric circuit diagram showing a drive circuit used in the first embodiment.

As shown in FIG. 2 in detail, the motor drive circuit 9 is constructed with four switching devices, MOSFETs 13, 14, 15 and 16, connected in the H-bridge type. The positive terminal and the negative terminals of the motor 3 are connected to an intermediate junction between the MOSFETs 13 and 16 at the right side and an intermediate junction between the MOSFETs 14 and 15, respectively. The high side of the motor drive circuit 9 is connected to the positive terminal side of the power source (battery) 11.

The current detection circuit 10 is connected to the low side of the motor drive circuit 9. The current detection circuit 10 is constructed with a current detection resistor 17 connected between the low side of the motor drive circuit 9 and the ground side and a differential amplifier circuit 18 which amplifies a difference of potentials at both ends of the current detection resistor 17.

The motor drive circuit 9 has a drive logic circuit 19. The drive command signals A1–A4 of the microcomputer 8 and the motor current detection signal of the current detection circuit 10 are applied to the drive logic circuit 19. Further, the motor current detection signal of the current detection circuit 10 is applied to the microcomputer 8.

Figure 3:
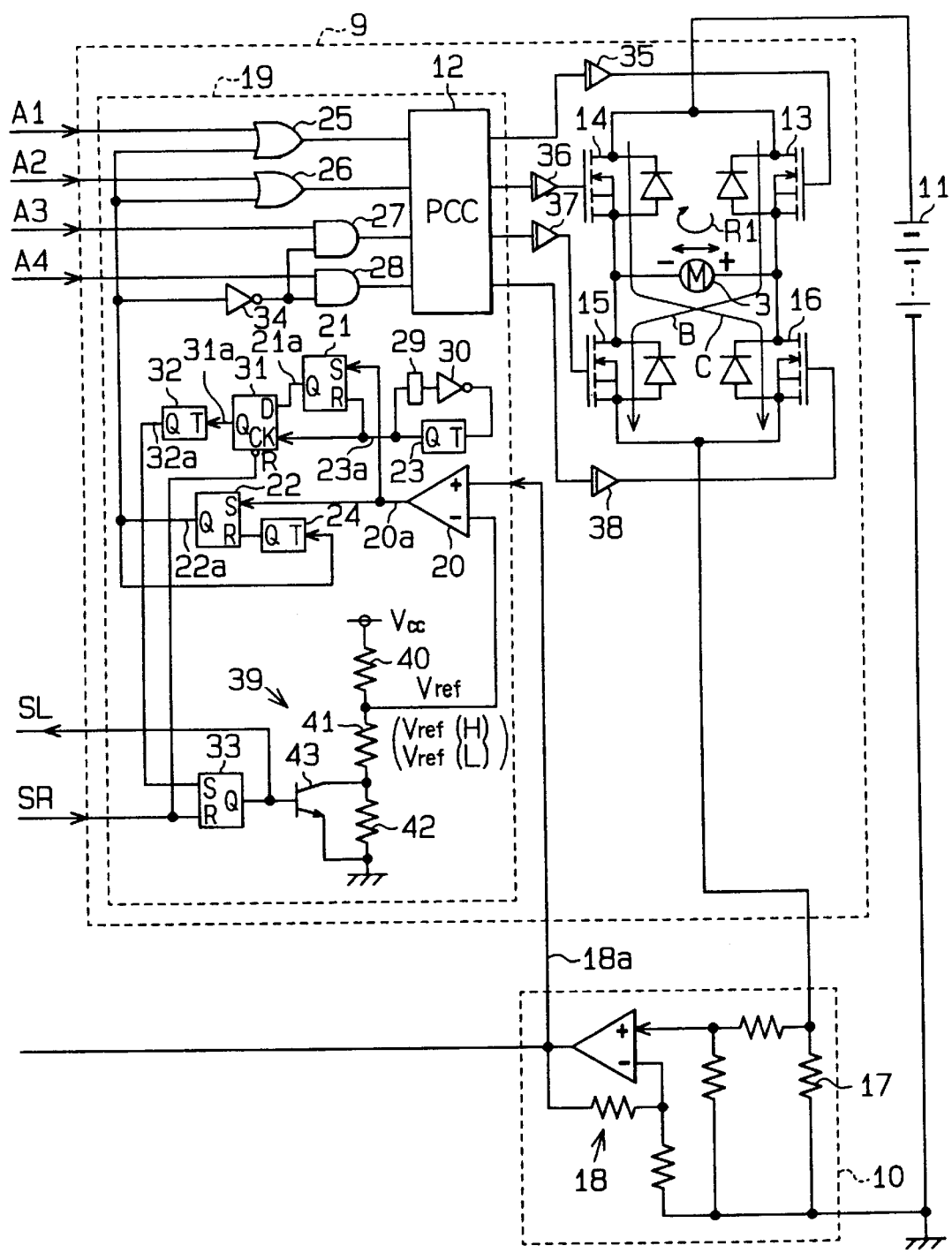
FIG. 3 is a detailed electric circuit diagram showing the drive circuit shown in FIG. 2.
Figure 4:
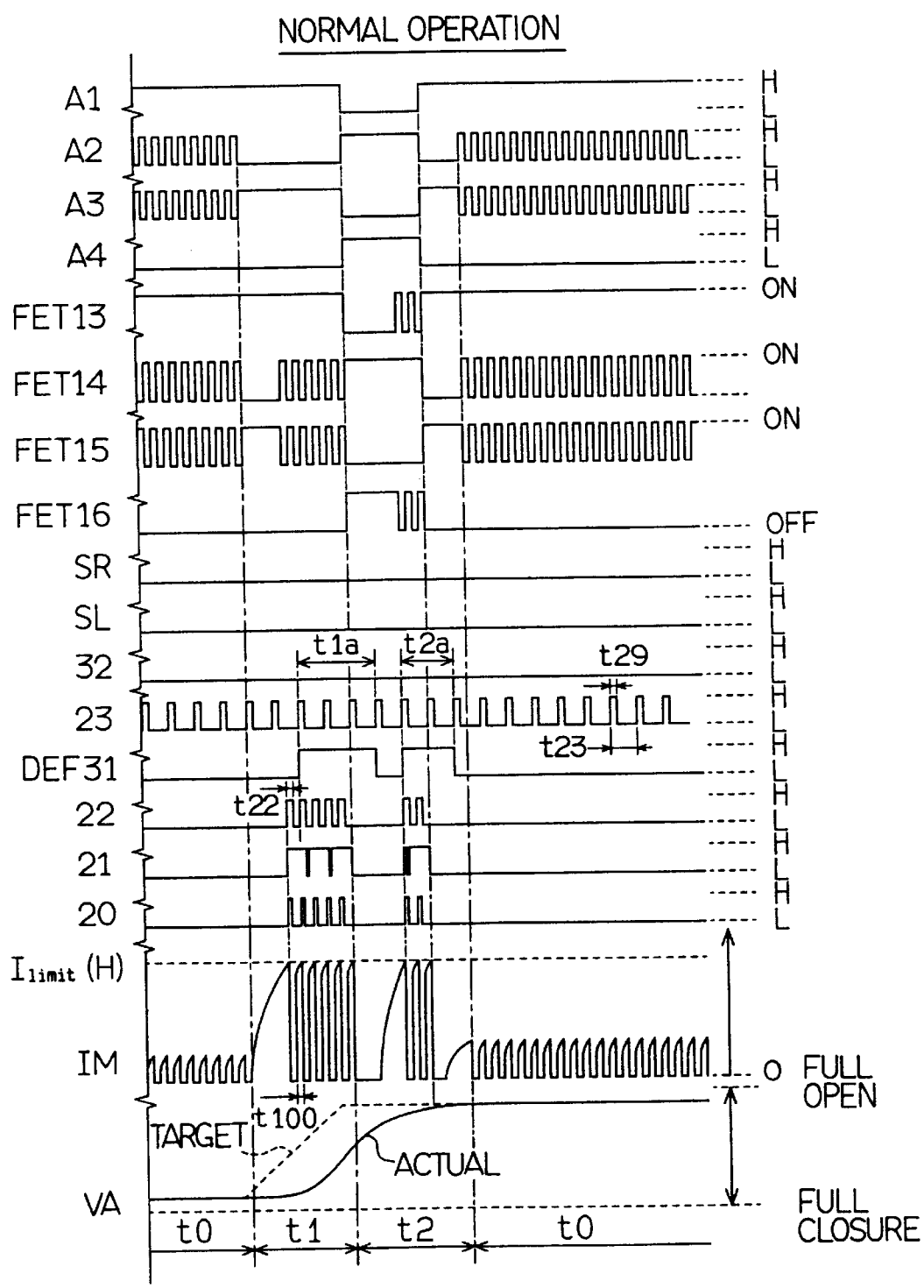
FIG. 4 is a timing diagram showing an operation of the first embodiment under a normal operation condition.
Figure 5:
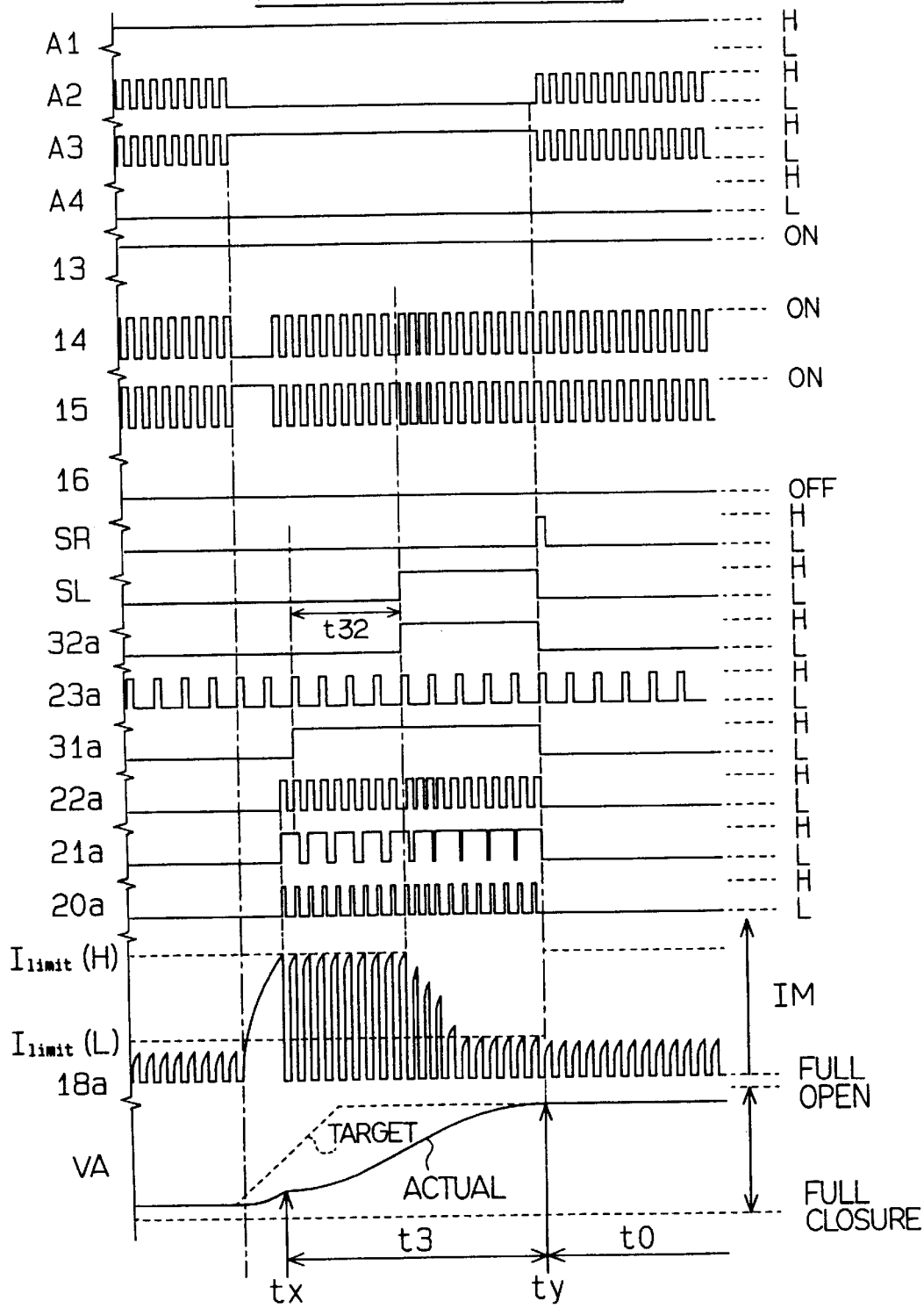
FIG. 5 is a timing diagram showing an operation of the first embodiment under a motor lock condition.
Figure 6:
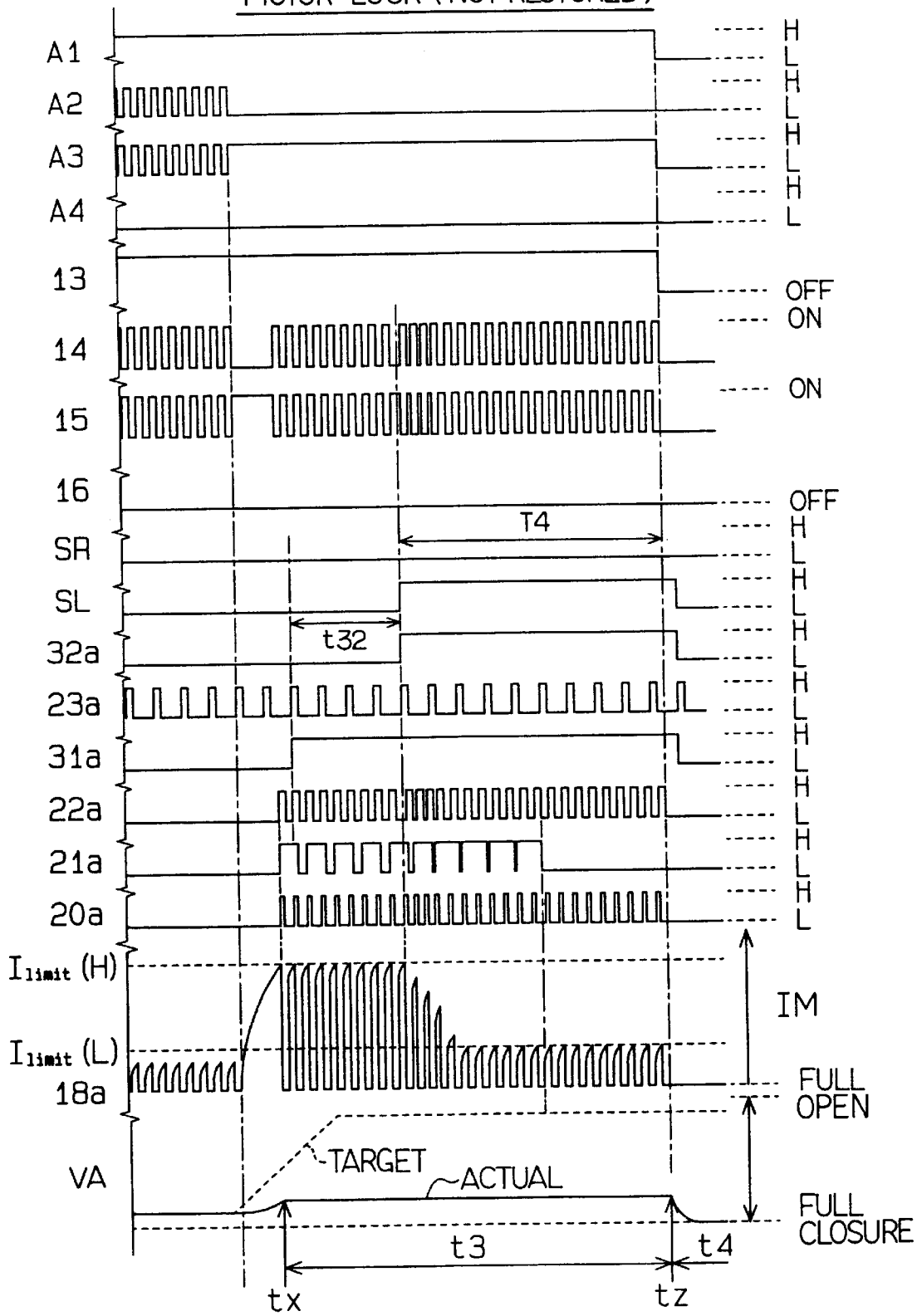
FIG. 6 is a timing diagram showing an operation of the first embodiment under the motor lock condition.

The drive logic circuit 19 is constructed as shown in FIG. 3. In connection with this description, reference is made to a timing diagram of FIG. 4 showing a normal operation, a timing diagram of FIG. 5 showing a motor lock (restored) and a timing diagram of FIG. 6 showing a motor lock (not restored).

The output of the current detection circuit 10 (voltage corresponding to the current to the direct current motor 3) shown in FIG. 3 is applied to the positive terminal of a comparator 20 to be compared with a reference voltage Vref applied to the negative terminal. The reference voltage Vref is set to correspond to the current limitation value at the time of the current limitation operation. This current limitation value is set to a value which will not damage the MOSFETs 13–16 even when the current supply is continued for a certain time period.

The output of the comparator 20 changes to the H-level (high level) each time the current of the direct current motor 3 exceeds the current limitation value. This H-level signal is applied to the set terminals S of RS latches 21 and 22 which are a set-priority type. The outputs of timers 23 and 24 are applied to the reset terminals R of the RS latches 21 and 22, respectively.

The RS latch 22 is set to produce the H-level signal from its output terminal Q to gates 25, 26, 27, 28, and the timer 24, when it receives from the comparator 20 at its set terminal S the H-level signal indicating that the current of the direct current motor 3 is in excess of the current limitation value. The timer 24 is for setting a time period during which the current supply to the direct current motor 3 is temporarily tuned off (interrupted) each time the current of the direct current motor 3 exceeds the current limitation value in the current limitation operation. The timer 24 starts a time counting operation by its internal counter in response to the H-level signal applied thereto.

It produces the H-level signal from its output terminal Q to the reset terminal R of the RS latch 22, when counting of a predetermined time period is completed. Thus, the RS latch 22 produces the L-level signal from its output terminal Q to the gates 25–28 and the timer 24 after being reset. The timer 24 resets its internal counter and changes its output at its output terminal Q to the L-level in response to the L-level signal applied thereto.

As described above, a closed loop is provided by the RS latch 22 and the timer 24. The output terminal Q of the RS latch 22 produces, as shown in FIG. 4, the H-level signal for the time period t22 to turn off the current supply to the direct current motor 3 each time the current supplied to the direct current motor 3 exceeds the current limitation value in the current limitation operation.

As shown in FIG. 3, the RS latch 21 receives at its reset terminal R the output of the output terminal Q of the timer 23. The timer 23 receives the output of its output terminal Q at its input terminal T through a delay circuit 29 and an inverter 30. Thus, the timer 23 inverts its output of its output terminal Q to the L-level. A delay circuit 29 inverts its output to the L-level after a fixed time period, and at the same time the inverter 30 applies the H-level signal to the input terminal T of the timer 23.

The timer 23 starts its time counting operation by the internal counter, and produces the H-level signal from its output terminal Q when counting the predetermined time period is completed. This H-level signal is applied to the inverter 30 after the fixed time delay. The inverter 30 applies the L-level signal to the input terminal T of the timer 23. Thus, the timer 23 resets its internal counter and inverts its output at the output terminal Q to the L-level.

As described above, a closed loop is provided by the timer 23, the delay circuit 29 and the inverter 30. As shown in FIG. 4, the timer 23 produces at its output terminal Q the H-level signal for the delay time period t29 of the delay circuit 29 every fixed time period t23 set by the timer 23.

The output at the output terminal Q of the timer 23 shown in FIG. 3 is applied to the reset terminal R of the RS latch 21 and the clock input terminal CK of a D flip-flop (DFF) 31. The output terminal Q of the RS latch 21 is connected to the data input terminal D of the D flip-flop 31.

The RS latch 21 is set to produce the H-level signal from its output terminal Q to the data input terminal D of the D flip-flop 31, when it receives at its set terminal S the H-level signal from the comparator 20 indicating that the current supplied to the direct current motor 3 is in excess of the current limit value. The RS latch 21 is reset by the H-level signal applied to its reset terminal R from the timer 23 every fixed time period t23. It produces the L-level signal from its output terminal Q to the data input terminal D of the D flip-flop 31.

On the other hand, the D flip-flop 31 stores and holds the output level, which is produced at the output terminal Q of the RS latch 23 and applied to its data input terminal D, at the timing when the output level of the timer 23 applied to its clock input terminal CK changes from the L-level to the H-level. It produces to the input terminal T of the timer 32 the L-level signal corresponding to the stored level.

As the RS latch 21 and the D flip-flop 31 operate as described above, the D flip-flop 31 produces the H-level signal from its output terminal Q to the input terminal T of the timer 32 as shown in FIG. 4, when the current supplied to the direct current motor 3 exceeds the current limitation value within the time period t23 set by the timer 23.

Here, the time period t23 set by the timer 23 is set to be longer than a time period which is a sum of the time period t22 and a time period t100 (FIG. 4). The time period t22 indicates a time period for temporarily turning off (interrupting) the current supply to the direct current motor 3 when the current of the direct current motor 3 exceeds the current limitation value in the current limitation operation.

The time period t100 indicates a time period in which the current of the direct current motor 3 exceeds the current limitation value again after restarting the current supply from the temporary turning off of the current supply. Thus, the output of the output terminal Q of the D flip-flop 31 is maintained at the H-level in the current limitation operation.

The timer 32 shown in FIG. 3 starts a time period counting by its internal counter, when the D flip-flop 31 produces from its output terminal Q the H-level signal indicating that the current supplied to the direct current motor 3 continues to exceed the current limitation value. It counts time periods t1a and t2a (FIG. 4) in which the current continues the current limitation value. The timer 32 produces from its output terminal Q to a latch 33 the H-level signal (start signal for the current limitation operation by Ilimit(L)), when it completes counting of the predetermined time period t32 as shown in FIG. 5.

The timer 32 resets its internal counter and produces the L-level signal from its output terminal Q to the latch 33, when it receives from the output terminal Q of the D flip-flop 31 the L-level signal indicating that the current supplied to the direct current motor 3 does not exceed the current limitation value.

Here, the time period t32 (FIG. 5) set by the timer 32 is for determining the timing to start the current limitation operation by the Ilimit(L) when the period of the current supply for initiating the motor drive or braking the motor 3 lasts long. It is set to be a little longer than the time period of the current supply for initiating the motor drive or motor braking in the normal operation.

Thus, as shown in FIG. 4, the actual throttle opening angle approaches the target throttle angle and the current supply for initiating the motor drive or motor braking ends before the time periods t1a and t2a counted by the internal counter of the timer 32 reach the time period t32 in the current supply for initiating and braking under the normal operation. As a result, the initiation of motor drive and the braking are executed while being subjected to the current limitation operation of the high current limitation value Ilimit(H), so that the drive responsiveness is improved at the time of initiating the motor drive and the braking.

The output (output to RS latch 22) to the gates 25–28 shown in FIG. 3 is inverted to the H-level for the time period t22 in which the current supply to the direct current motor 3 is temporarily turned off each time the current supplied to the direct current motor 3 exceeds the current limitation value, because the current limitation is effected with the high current limitation value Ilimit(H) during the normal operation (FIG. 4).

The output of the RS latch 22 is applied to the OR gates 25 and 26, and also applied to the AND gates 27 and 28 through an inverter 34. The drive command signals A1–A4 produced from the microcomputer 8 are applied to the OR gates 25, 26 and the AND gates 27, 28, respectively. The outputs of the OR gates 25 and 26 are applied to the MOSFETs 13 and 14 at the high side through a protective control circuit 12 and pre-drivers 35 and 36. Thus, the MOSFETs 13 and 14 at the high side turns on when the drive command signals A1 and A2 for the high side are at the H-level.

Further, the MOSFETs 13 and 14 at the high side turn on even during the time period of temporarily turning off the current supply in the current limitation operation, so that the energy remaining in the coil of the direct current motor 3 in the turn-off period of the current supply during the current limitation operation is circulated through a circulation path R1.

The outputs of the AND gates 27 and 28 are applied to the gates of the MOSFETs 15 and 16 at the low side through the protective control circuit 12 and pre-drivers 37, 38. Thus, the MOSFETs 15 and 16 at the low side turn on when the drive command signals A3 and A4 are at the H-level and the output of the inverter 34 is at the H-level.

During the current limitation operation (FIGS. 4 and 5), the output of the RS latch 22 (indicated by 22a in FIG. 5) is inverted to the H-level for the time period of temporarily turning off the current supply to the direct current motor 3 each time the current supplied to the direct current motor 3 exceeds the current limitation value. Thus, the output of the inverter 34 is inverted to the L-level for the time period of turning off the current supply to the direct current motor 3 each time the current of the motor 3 exceeds the current limitation value.

Therefore, the output of the AND gate 27 (or 28) changes to the L-level temporarily each time the current of the direct current motor 3 exceeds the current limitation value. Thus, the MOSFETs 15 (or 16) at the low side is temporarily turned off to reduce the current of the direct current motor 3 to less than the current limitation value each time the current of the direct current motor 3 exceeds the current limitation value during the current limitation operation.

As shown in FIG. 3, a reference voltage switching circuit 39 is connected to the negative input terminal of the comparator 20. The circuit 39 is for switching the reference voltage Vref applied to the negative input terminal of the comparator 20 between a voltage Vref(H) corresponding to the high current limitation value Ilimit(H) and a voltage Vref(L) corresponding to the low current limitation value Ilimit(L).

In the reference voltage switching circuit 39, three resistors 40, 41 and 42 are connected in series between the power source voltage Vcc and the ground. The collector and emitter of a transistor 43 are connected to both ends of the resistor which is at the ground side, and the intermediate junction between the resistors 40 and 41 is connected to the negative input terminal of the comparator 20.

The output terminal Q of a latch 33 is connected to the base of the transistor 43 which is for switching the reference voltage, so that the reference voltage Vref (current limitation value) is switched in response to the output of the latch 33. This latch 33 receives at its input terminal S from the timer the signal which indicates that the limitation operation with the predetermined current limitation value Ilimit(H) continued for the predetermined time period. It is set when this signal changes to the H-level, and stores and holds it to produce the H-level signal at the output terminal Q.

The transistor 43 turns on in response to the H-level signal to execute the current limitation operation by Ilimit(L). Thus, the current limitation continuation determination signal is stored and held in the latch 33. This signal is applied from the timer 32 which checks the continuation of the current limitation by Ilimit(H) to the transistor 43 which reduces the current limitation value. In this embodiment, the latch 33 is used as storing and holding means for the current limitation continuation determination signal.

The output terminal Q of the latch 33 is also connected to the microcomputer 8 to apply a monitor signal SL indicative of the condition of current limitation by Ilimit(L) to the microcomputer 8. That is, the current limitation condition monitor signal SL indicates that the current limitation operation by the predetermined current Ilimit(H) continued for the predetermined period longer than the period of current supply for initiating the motor drive or for braking and the current limitation operation is being executed with the low current limitation current Ilimit(L) switched from the high limitation current value (that is, current limitation condition after the determination of lock).

The reset terminal R of the latch 33 is connected to the microcomputer 8 to receive from the microcomputer 8 a current limitation cancellation command signal (reset command signal) SR which requests a cancellation of the low current limitation. The latch 22 is reset in response to this signal SR (H-level) to produce the L-level signal from its output terminal Q.

The current limitation cancellation command signal SR is applied to the reset terminal R of the D flip-flop 31. The D flip-flop 31 and the latch 33 are reset by this signal SR. The D flip-flop 31 produces the L-level signal to the output terminal Q thereby to reset the timer 32 and clear the current limitation continuation determination condition. Thus, the timer 32 which checks the current limitation condition is reset by the current limitation cancellation command signal SR.

The protective control circuit 12 includes a logic such as an excessive current protective control logic and the like thereby to prevent an excessive current, that is, feedthrough current, which is caused when the MOSFETs 13–16 at the high side and the low side connected to both terminals of the direct current motor 3 at the same time, or to forcibly turn off the MOSFETs 13–16 when the excessive current flows.

As described above, the present system has the throttle valve 2 as the driven object which is position-controlled by the motor 3, the drive circuit 9 which supplies the current to the motor 3, the throttle angle sensor 4 as position detection means which detects the position of the throttle valve 2, and the microcomputer 8 as control means which receives the position detection signal from the throttle angle sensor 4 and produces the drive command signals A1–A4 for controlling the position of the throttle valve 2 to the target position.

The operation of the motor drive apparatus as constructed above is described next with reference to FIG. 7. The microcomputer 8 repeats this processing at a short time interval which is sufficiently short not to influence the valve operation due to operation delay.

Figure 7:
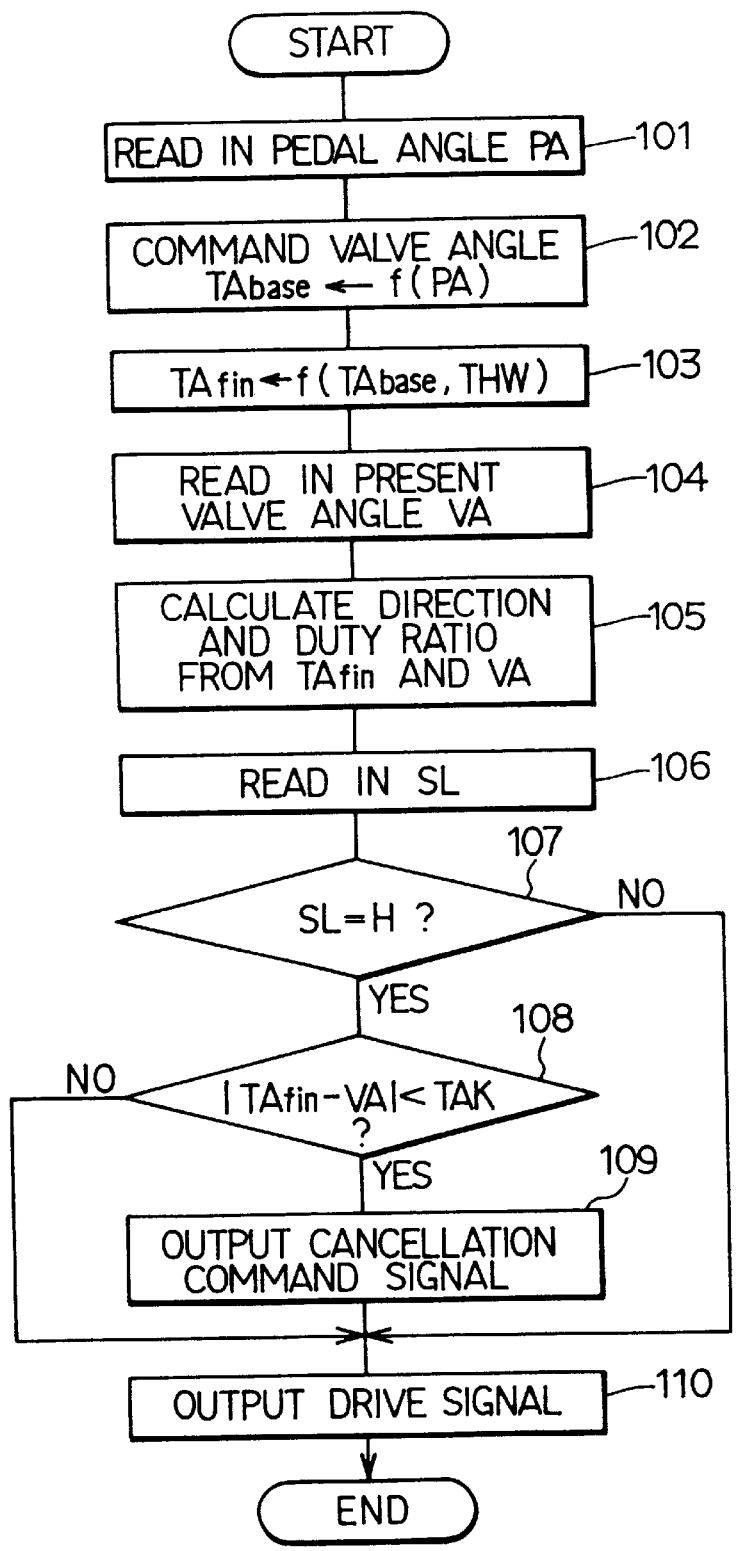
FIG. 7 is a flow diagram showing a control processing executed by a microcomputer in the first embodiment.

FIG. 7 is for describing in detail with respect to producing the current limitation cancellation command signal at step 109. The microcomputer 8 also executes various processing (current drive initiating current supply processing and braking current supply processing) other than the processing shown in FIG. 7.

The microcomputer 8 first reads in the angle PA of the accelerator pedal 5 from the signal of the accelerator sensor 6 at step 101, and calculates a basic target valve angle TAbase in correspondence with the accelerator pedal angle PA at step 102. Further, the microcomputer 8 corrects the basic target valve angle TAbase with an engine coolant temperature THW and the like at step 103 to calculate a final target valve angle TAfin. Further, the microcomputer 8 reads in the present angle VA of the throttle valve 2 from the signal of the throttle angle sensor 4 at step 104, and calculates the direction of motor rotation and the duty ratio from the final target valve angle TAfin and the throttle angle VA at step 105.

The microcomputer 8 further reads in the current limitation condition monitor signal SL at step 106. It then checks at step 107 whether the current limitation monitor signal SL is at the H-level or not, that is, whether the current limitation is executed under the lock condition. If the current limitation condition monitor signal SL is at the H-level (current is limited), the microcomputer 8 compares a difference (=|TAfin−VA|) between the final target valve angle TAfin and the present valve angle VA with a target angle approaching reference value TAK at step 108. That is, it checks whether |TAfin−VA| approached to zero and the valve angle VA substantially approached to the predetermined final target valve angle TAfin. If |TAfin−VA| is more than the target angle approaching reference value TAK, the microcomputer 8 produces the drive signals (drive command signals A1–A4) at step 110.

If |TAfin−VA| is less than the target angle approaching reference value TAK, the microcomputer 8 determines that the motor has restored to its normal operation and outputs the current limitation cancellation command signal SR at step 109.

That is, when the valve angle position detection signal indicates that the target angle is substantially attained at the timing ty in FIG. 5, the microcomputer 8 produces the current limitation cancellation command signal SR (H-level pulse) and resets the latch 33 of FIG. 3 which holds and outputs the current limitation condition monitor signal SL. It also resets the flip-flop 31 at the same time to reset the timer 32 which checks the continuation of the current limitation operation, so that checking the continuation of the current limitation is cancelled.

The output terminal Q of the latch 33 changes to the L-level to turn off the transistor 43 which switches the current limitation threshold value. As a result, the current limitation threshold value is switched back to the H-level Ilimit(H). The operation associated with turning off of the transistor 43 is described in detail later.

Thus, the signal SR is produced to cancel the current limitation, when the position detection signal of the throttle angle sensor 4 indicates the predetermined behavior of the throttle valve 2, that is, the throttle valve 2 made a predetermined change, more specifically the throttle valve 2 reached the required position.

Next, the timing diagrams shown in FIGS. 4–6 are described below. The normal operation is described first with reference to FIG. 4.

The timing diagram shown in FIG. 4 shows from the top the levels of the drive command signals A1–A4, on/off conditions of the MOSFETs 13–16, current limitation cancellation command signal SR, current limitation condition monitor signal SL, output level of the timer 32, output level of the timer 23, output level of the D flip-flop 31, output level of the RS latch 22, output level of the RS latch 21, output level of the comparator 20, detection current of the motor (motor current), and the throttle angle (detection value of the throttle angle sensor).

Normally, the transistor 43 for switching the reference voltage is held at off condition, because the output of the timer 32 in FIG. 3 is maintained at the L-level. Under this condition, the reference voltage Vref applied to the comparator 20 from the reference voltage switching circuit 39 shown in FIG. 3 is maintained at the voltage Vref(H) corresponding to the high current limitation value Ilimit(H). Vref(H) is expressed as follows, assuming that resistances of three resistors 40–42 of the reference voltage switching circuit 39 are R40–R42.

Vref(H)=Vcc÷(R41+R42)/(R40+R41+R42)

This high reference voltage Vref(H) is set to a high current value so that the current limitation value does not damage the drive initiation performance (or braking).

During the period t0 in which the throttle valve 2 remains at rest and the throttle angle does not change, the microcomputer maintains its drive command signal A1 at the H-level to maintain the throttle valve 2 at the same angle against the return spring. The microcomputer 8 switches the drive command signal A3 between the H-level and the L-level at the predetermined duty ratio to turn on and off the MOSFET 15 at the low side and left side while maintaining the MOSFET 13 at the high side and the right side turned on. Thus, the throttle valve 2 is maintained at the same angle by supplying the direct current motor 3 with the current of the predetermined duty ratio in the arrow direction (forward direction) B in FIG. 3.

Specifically, the hold current supply period t0 is a period in which a change in the target valve angle required by the pedal position detection signal or the like is within a predetermined value or a change rate per unit time is within a predetermined value. A feedback control is effected to match the actual throttle angle with the target throttle angle thereby maintaining the angle of the throttle valve 2 at the target valve angle.

During this hold current supply period t0, each time the drive command signal A3 is at the L-level, the drive command signal A2 is switched to the H-level during that L-level period. Thus, each time the MOSFET 15 at the low side and the left side turns off, the MOSFET 14 at the high side and the left side is turned on so that the energy remaining in the coil of the direct current motor 3 is circulated in the feedthrough path R1.

That is, the drive command signal A2 is simultaneously produced in opposite on/off relation with the drive command signal A3 to absorb the energy which remains in the coil of the motor when the current supply is turned off. As the drive circuit 9 turns on the MOSFET 14 in response to the drive command signal A2 at the time of turning off of the MOSFET 15 thereby to flow the energy remaining in the motor through the feedthrough path R1 to absorb it.

When the accelerator pedal 5 is depressed and the target throttle angle is changed thereafter, the microcomputer 8 starts to drive the direct current motor 3 with 100% duty ratio so that drive initiation is effected to control the actual throttle angle closely to the target throttle angle. During this drive initiation current supply period t1, the drive command signals A1 and A3 are maintained at the H-level to maintain the MOSFET 13 at the high side and the right side and the MOSFET 15 at the low side and the left side turned on. The direct current motor 3 is supplied with the current of 100% duty ratio in the arrow direction B (forward direction) in FIG. 3 so that the drive initiation torque is increased to move the throttle valve 2 at high speeds.

Here, at the time of starting the drive initiation current supply, the direct current motor 3 is supplied with the current of 100% duty ratio. Each time the current of the direct current motor 3 exceeds the high current limitation value Ilimit(H) set represented by the high reference voltage Vref(H) during the drive initiation current supply period t1, the output of the RS latch 22 changes to the H-level only during the time period t22 set by the timer 24.

This H-level signal is inverted to the L-level signal by the inverter 34 and applied to the AND gate 27. For this reason, even when the drive command signal A3 for the low side is at the H-level, the output of the AND gate 27 changes to the L-level temporarily each time the current of the direct current motor 3 exceeds the current limitation value Ilimit (H). Thus, the MOSFET 15 at the low side is turned off each time the current of the direct current motor 3 exceeds the high current limitation value Ilimit(H). The current of the direct current motor 3 is thus limited to less than the high current limitation value Ilimit(H).

In the application to automotive vehicles and the like to which a high safety is required, the biasing force of the return spring applied to the throttle valve 2 is set large enough to return the throttle valve 2 to the safe position without fail upon occurrence of failure. Because a large motor current which corresponds to the torque sufficient to exceed the return force and drive the throttle valve 2 with high responsiveness is required, the current limitation value Ilimit(H) should be set to a comparatively H-level.

During this current limitation operation, the output of the OR gate 26 is changed to the H-level in the off period of the MOSFET 15 at the low side (H-level period of RS latch 22). The MOSFET 14 at the high side and the left side is turned on so that the energy remaining in the coil of the direct current motor 3 is circulated through the feedthrough path R1.

When the microcomputer 8 detects that the throttle valve 2 is entering into a predetermined zone provided for the target throttle angle due to the drive initiation current supply, the drive initiation current supply period t1 ends and the braking current supply is effected. The direct current motor 3 is supplied with the current of 100% duty ratio in reverse at the start of braking. That is, when the microcomputer 8 detects that the actual throttle angle is entering into the predetermined zone provided for the target throttle angle in the drive initiation current supply period t1, the drive initiation current supply period t1 is terminated and the braking current supply is effected to brake the throttle valve 2 in motion and stop it at the target throttle angle.

During this braking period t2, the MOSFET 14 at the high side and the left side and the MOSFET 16 at the low side and the right side are both maintained turned on. The direct current motor 3 is supplied with the current of 100% duty ratio in the arrow direction C (reverse direction) in FIG. 3. Thus, the braking force is increased to stop the throttle valve 2 at the target throttle angle.

Each time the current of the direct current motor 3 exceeds the high current limitation value Ilimit(H) represented by the high reference voltage Vref(H) during this braking current supply period t2, the output of the RS latch 22 is changed to the H-level only for the period t22 set by the timer 24. In the same manner as in the above drive initiation current supply, the current supply is temporarily turned off each time the current of the direct current motor 3 exceeds the current limitation value Ilimit(H). As a result, the current of the motor 3 is limited to less than the high current limitation value Ilimit(H). Further, the same hold current supply control is effected as before the drive initiation (period t0), after the throttle valve 2 is stopped at the target throttle angle.

The operation in the case of motor lock (restored) is described next with reference to FIG. 5. FIG. 5 shows a case in which the motor lock occurs at the timing tx immediately after starting the drive initiation current supply with 100% duty ratio.

It may occur that the drive initiation current supply continues, when the throttle valve 2 does not approach the target throttle angle even if the drive initiation limited with the high current limitation value Ilimit(H) is effected. Thus, the current limitation value is lowered in the following manner, when the drive initiation count period t1a counted by the internal counter of the timer 32 in FIG. 3 (period of the motor current in excess of the current limitation value Ilimit(H)) reaches the period t32.

When the drive initiation count period t1a counted by the internal counter of the timer 32 reaches the period t32, the H-level signal is applied from the timer 32 to the base of the reference voltage switching transistor 43 through the latch 33. Thus, the transistor 43 is turned on and both ends of the resistor 42 in the reference voltage switching circuit 39 is shorted. The reference voltage Vref applied from the reference voltage switching circuit 39 to the comparator 20 is switched to the voltage Vref(L) which corresponds to the low current limitation value Ilimit(L). This low reference voltage Vref(L) is expressed as follows.

$$Vref(L)=Vcc \times R41/(R40+R41)$$

This low current limitation value Ilimit(L) set by the low reference voltage Vref(L) is set to a low current value which will not damage the MOSFETs 13–16 even if it is continued to be supplied for a certain period under the motor lock condition.

Thus, when the reference voltage Vref applied to the comparator 20 is switched to the voltage Vref(L) which corresponds to the low current limitation value Ilimit(L), the output of the RS latch 22 is changed to the H-level only for the time period set by the timer 24 each time the current of the direct current motor 3 exceeds the low current limitation value Ilimit(L). This H-level signal is inverted to the L-level signal by the inverter 34 and applied to the AND gate 27. Thus, the MOSFET 15 at the low side is turned off temporarily each time the current of the direct current motor 3 exceeds the current limitation value Ilimit(L). As a result, the current supplied to the direct current motor 3 is limited to less than the current limitation value Ilimit(L).

The output of the OR gate 26 is inverted to the H-level during the period of turning off of the MOSFET 15 at the low side (H-level period of the output of the RS latch 22). The MOSFET 14 at the high side and the left side is turned on so that the energy remaining in the coil of the direct current motor 3 is circulated in the feedthrough path R1.

When the microcomputer 8 detects in the processing shown in FIG. 7 that the motor lock has disappeared and the throttle valve 2 is entering into the predetermined zone provided for the target throttle angle (timing ty in FIG. 5) during the current limitation operation period, the signal SR (current limitation cancel command signal) is produced to cancel the current limitation operation.

Although FIG. 5 shows the operation in which the motor lock occurs during the drive initiation current supply, the same control is effected in the case of occurrence of motor lock during the braking.

The operation at the time of motor lock (not restored) is described next with reference to FIG. 6. FIG. 6 shows an example of operation performed when the motor lock occurs at the timing tx immediately after starting the drive initiation current supply with 100% duty ratio and this motor lock continues.

When the opening angle of the throttle valve 2 does not approach the target throttle angle under the condition that the current limitation operation is continued for a certain period, the microcomputer 8 interrupts the current supply to the direct current motor 3 as follows.

The microcomputer 8 receives the current limitation condition monitor signal SL which is produced from the latch 33 shown in FIG. 3 to indicate that it is in the middle of the current limitation operation period, and counts the period in which the H-level signal indicating the current limitation operation continues. The microcomputer changes all of its drive command signals A1–A4 to the L-level to interrupt the current supply to the direct current motor 3 at the time the counted period reaches the predetermined time period T4. That is, the MOSFETs 13–16 are turned off to interrupt the current to the motor and enters into the current supply interruption mode t4. Thus, the current supply to the direct current motor 3 is interrupted, when the angle of the throttle valve 2 does not approach the target throttle angle under the condition that the current limitation operation with the low current limitation value Ilimit(L) is continued for some time period.

In addition, the microcomputer 8 may count the time period in which the difference between the actual throttle angle and the target throttle angle in excess of the predetermined difference continues, and determines the motor lock when the counted time period reaches a predetermined time period. All the drive command signals A1–A4 are changed to the L-level to interrupt the current supply to the direct current motor 3.

As described with reference to FIGS. 5 and 6, the motor drive is continued with the current limitation under the motor lock condition to reduce the current flowing through the MOSFETs 13–16 which drive the motor.

Although FIG. 6 shows the operation when the motor lock occurs in the course of the drive initiation current supply, the same control is effected when the motor lock occurs in the braking.

As described above, heat generation of the MOSFETs 13–16 can be reduced by limiting the current flowing in the MOSFETs 13–16 to the low current value Ilimit(L), when the limitation operation with the current limitation value Ilimit(H) continues for the time period t32 during the drive initiation current supply period (braking current supply period). Thus, the current can be continued to be supplied to the direct current motor 3 for some time period even under the motor lock condition.

The motor can be restored to the normal condition by the continuation of applying the drive torque for some time when the lock condition is temporary and light. As the heat generation of the MOSFETs 13–16 are reduced, the MOSFETs 13–16 can be sized small and reduced in cost. As a result, the drive circuit 9 can be constructed in low cost without lessening the drive response characteristics of the throttle valve 2.

In particular, the current limitation value Ilimit(L) is within the current variation range in the normal operation zone of the motor 3 (normal current zone Znor in FIG. 17). Specifically, it is the maximum value InorMAX in the normal current zone Znor in FIG. 17. As a result, the current limitation value can be reduced in comparison with the case where the current limitation value Ilimit(L) is set to a value larger than InorMAX value as shown by (I) in FIG. 17.

That is, the restoration from the lock condition is determined from that the motor current value IM restores to the normal current zone Znor (decreasing to the maximum value InorMAX in the normal current zone) in the conventional apparatus. Therefore, the current limitation value Ilimit(L) under the lock condition should be set larger than the maximum value InorMAX of the normal current zone Znor, resulting in impediment to size reduction of the drive device. Further, if the current limitation value Ilimit(L) is set to the maximum value InorMAX of the normal current zone Znor, it may occur that the current value does not decrease form the limitation value Ilimit(L) even when released from the lock condition. In this instance, it is impossible to check the release from the lock condition. The current limitation value Ilimit(L) under the lock condition is required to be set to a value larger than the normal current zone Znor to eliminate this problem. This requires a large-sized drive device.

On the other hand, according to the present invention, the release from the motor lock is not detected by monitoring the motor current, but by monitoring the behavior of the throttle angle in the processing of steps 107–109 of FIG. 7. This is based on that the throttle angle will change in the position feedback system when the lock is released. The release from the lock is detected when the monitored throttle exhibits the predetermined behavior to produce the cancellation signal. As a result, the current limitation value under the lock condition can be reduced to the current limitation range in the normal operation (maximum current value of the normal range). The loss in electric power of the drive device can be reduced to attain reduction in size and cost of the drive device.

Thus, the present embodiment has the following features.

(a) The microcomputer 8 as the current limitation means and the cancellation means limits the current to the motor 3 not to exceed the predetermined value in the current variation range in the normal operation zone of the motor 3, when the throttle valve (driven object) 2 cannot be controlled to the target position and stays at substantially the same position.

Further, it cancels the current limitation on the motor 3 not based on the change in the motor current but based on the position detection signal from the throttle angle sensor (position detection means) 4, when the current limitation is effected. As a result, the current limitation value under the motor lock condition can be reduced in the motor drive apparatus having the current limitation function while ensuring a detection of the release from the lock condition.

(b) Particularly, the microcomputer 8 cancels the current limitation on the motor 3 upon detecting the predetermined behavior of the throttle valve 2 (arrival of the driven object at the required position in this embodiment) in response to the position detection signal from the throttle angle sensor 4 under the current limitation condition. Therefore, this system is more preferred.

In addition, it is possible to cancel the current limitation on the motor 3 upon detecting a predetermined change of the driven object (the change in the position of the driven object exceeds the predetermined value).

Although the current limitation operation is controlled by the drive logic circuit 19 constructed in hardware, the current limitation operation may be controlled by a program control of the microcomputer. Further, the H-bridge drive circuit 9 may be constructed with switching devices other than MOSFETs 13–16. Still further, the present invention should not be limited to the electronic throttle system but may be applied to various apparatuses which use direct current motors.

Second Embodiment

The second embodiment is described next with reference to the difference from the first embodiment.

In the first embodiment, the current limitation to the motor 3 is cancelled by the processing (software construction) of the microcomputer 8 based on the valve position, when the current limitation is effected. According to this embodiment, however, the current limitation to the motor 3 is cancelled by the hardware construction. Specifically, the switching of the current supply to the motor is detected from the drive command signal, and the current limitation is cancelled when the direction of current supply is switched.

Figure 8:
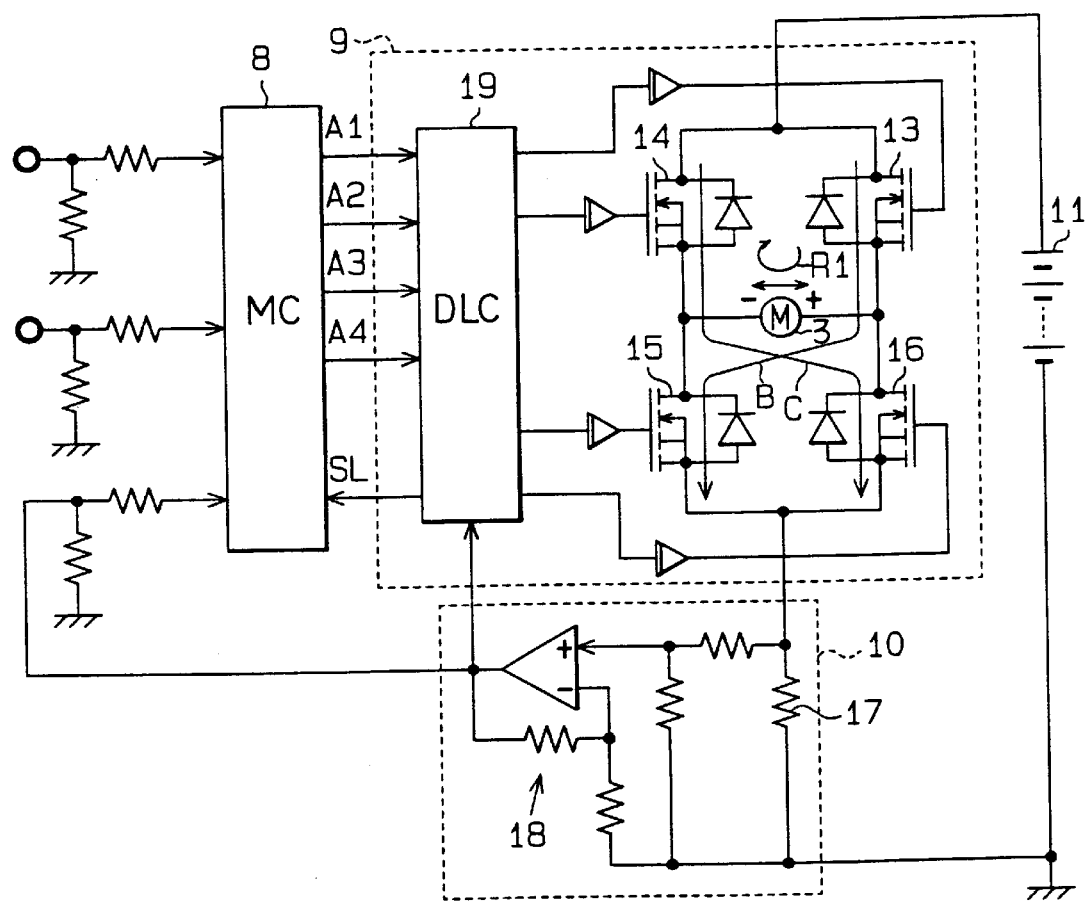
FIG. 8 is an electric circuit diagram showing the drive circuit used in a second embodiment of the present invention.

As shown in FIG. 8, it is checked whether the direction of drive current supply is a B-side or C-side from the drive command signals A1–A4 produced from the microcomputer 8, so that the phase of the drive current supply may be detected in the motor drive circuit 9. The current supply through the circulation path R1 is effected by the MOSFETs 13 and 14 at the high side. The drive command signals A1 and A2 for the high side MOSFETs become H-level which turns on during the current supply circulation time, even when the drive current supply phases of the same are not in the current supply direction B and C, respectively. As a result, the direction is not easily determined. It is therefore appropriate to determine the current supply phase from the signals A3 and A4, because the drive command signals A3 and A4 for the MOSFETs 15 and 16 at the low side.

Further, storage means is provided to store the previous current supply phase as a reference for comparison so that the change is checked. In addition, means is provided to produce a signal indicative of disagreement between the stored previous current supply phase and the present current supply phase.

The detailed circuit construction is described next with reference to FIG. 9. A reset pulse generator circuit 60 is provided to receive the low side drive command signals A3 and A4 at input terminals S of latches 64 and 65 through AND gates 61 and 62. Other input terminals of the AND gates 61 and 62 are both connected to the output of a delay 67, so that one of the latches which is at the side of the drive command signal of H-level is set during the output of the delay 67 is at the H-level. That is, when the current supply direction is B, the drive command signal A3 becomes the H-level and the latch 64 is set through the AND gate 61. When the current supply direction is C, the drive command signal A4 becomes the H-level and the latch 65 is set through the AND gate 62. Thus, each direction of the current supply is stored.

On the other hand, the input terminals R of the latches 64 and 65 are connected to receive the drive command signals A4 and A3, respectively, which are opposite to the signals applied to the input terminals S. The latch is reset when the drive command signal opposite to the current supply direction set in corresponding to each latch becomes the H-level. That is, the drive command signal A3 becomes the H-level and the latch 65 is reset, when the current supply direction is B. The drive command signal A4 becomes the H-level and the latch 64 is reset, when the current supply direction is C. Thus, each latch is reset when the current supply direction is switched from the previous direction stored in the same.

As described above, the current supply direction B is stored when the latch 64 is set, while the current supply direction C is stored when the latch 65 is set.

The output terminals Q of the latches 64 and 65 are connected to an OR gate 63, and the output of the OR gate 63 is applied to the delay 67 through a NOT gate 66. The OR gate 63 produces the H-level when the output terminal Q of either latch is at the H-level, and a NOT gate 66 inverts it to the L-level. The L-level is applied to the input terminals S of the latches 64 and 65 irrespective of the drive command signals A3 and A4.

The OR gate 63 produces the L-level when both output terminals Q of the latches 64 and 65 are at the L-level, and the NOT gate 66 inverts it to the H-level. The H-level signal is applied to both input terminals of the AND gates 61 and 62 through the delay 67, and the drive command signals A3 and A4 are applied to the input terminals S of the latches 64 and 65.

That is, when the current supply direction is switched, the current supply direction once stored in the latches 64 and 65 is set. Specifically, the latch storing the current supply direction is reset, the H-level signal is supplied to the delay 67 through the OR gate 63 and the NOT gate 66. The H-level signal is applied to the AND gate 61 and 62 after the time period set by the delay 67, and the drive command signals are applied to the input terminals S of the latches 64 and 65.

After the setting, the OR gate 63 produces the H-level signal again and the NOT gate 66 produces the L-level signal.

The L-level signal is applied to both AND gate 61 and 62 through the delay 67 to disable the latches 64 and 65 from being set.

As a result, when the current supply direction is switched, the H-level signal is produced to the NOT gate 66 for the period set by the delay 67, so that this signal may be produced as a reset pulse at the time of switching the current supply direction. The output of the NOT gate 66 is applied to the reset terminal R of the flip-flop 31 and the reset terminal R of the latch 33.

Figure 9:
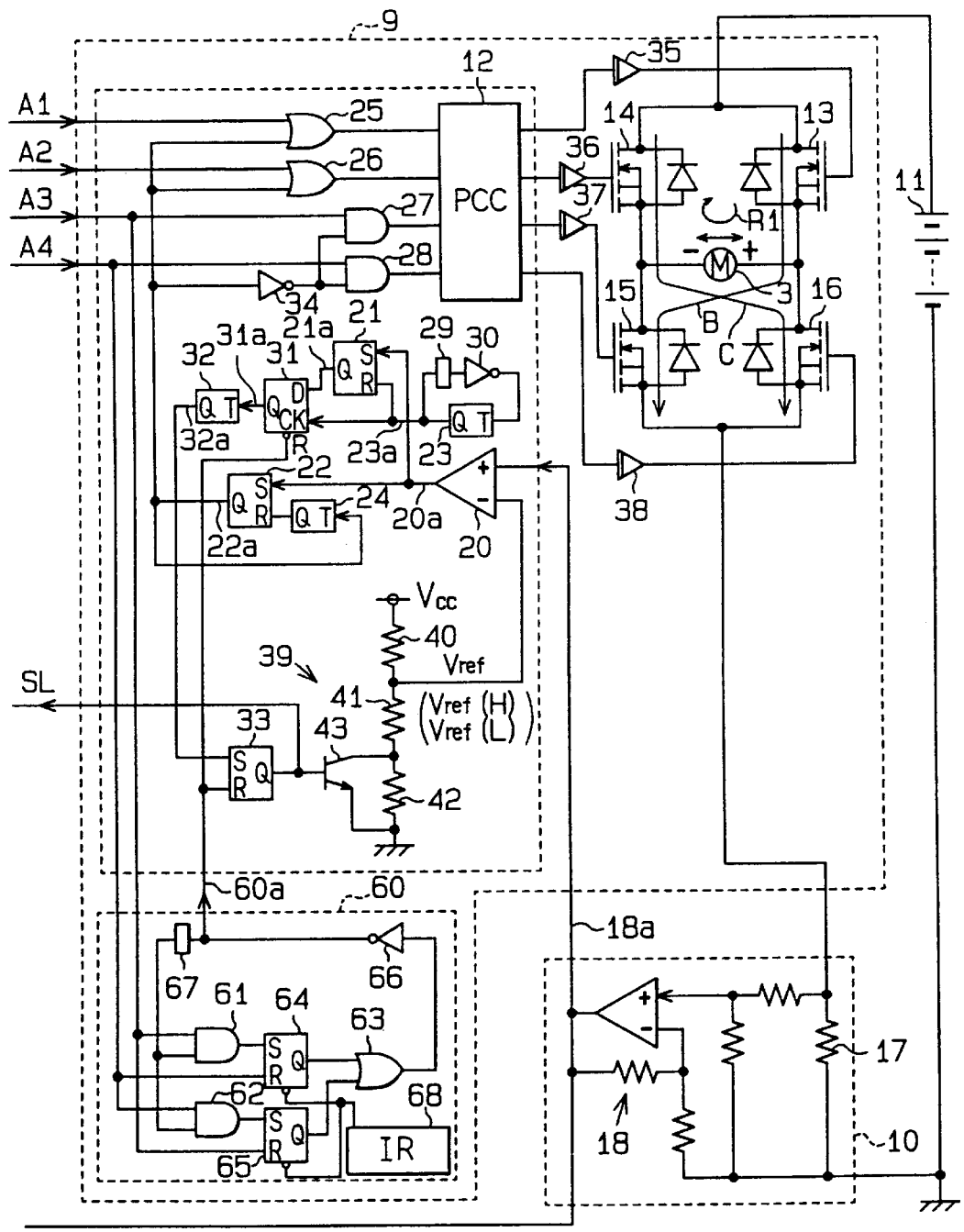
FIG. 9 is a detailed electric circuit diagram showing the drive circuit shown in FIG. 8.

In the reset pulse generator circuit 60 shown in FIG. 9, an initial reset circuit 68 is provided to initially reset the latches 64 and 65.

Figure 10:
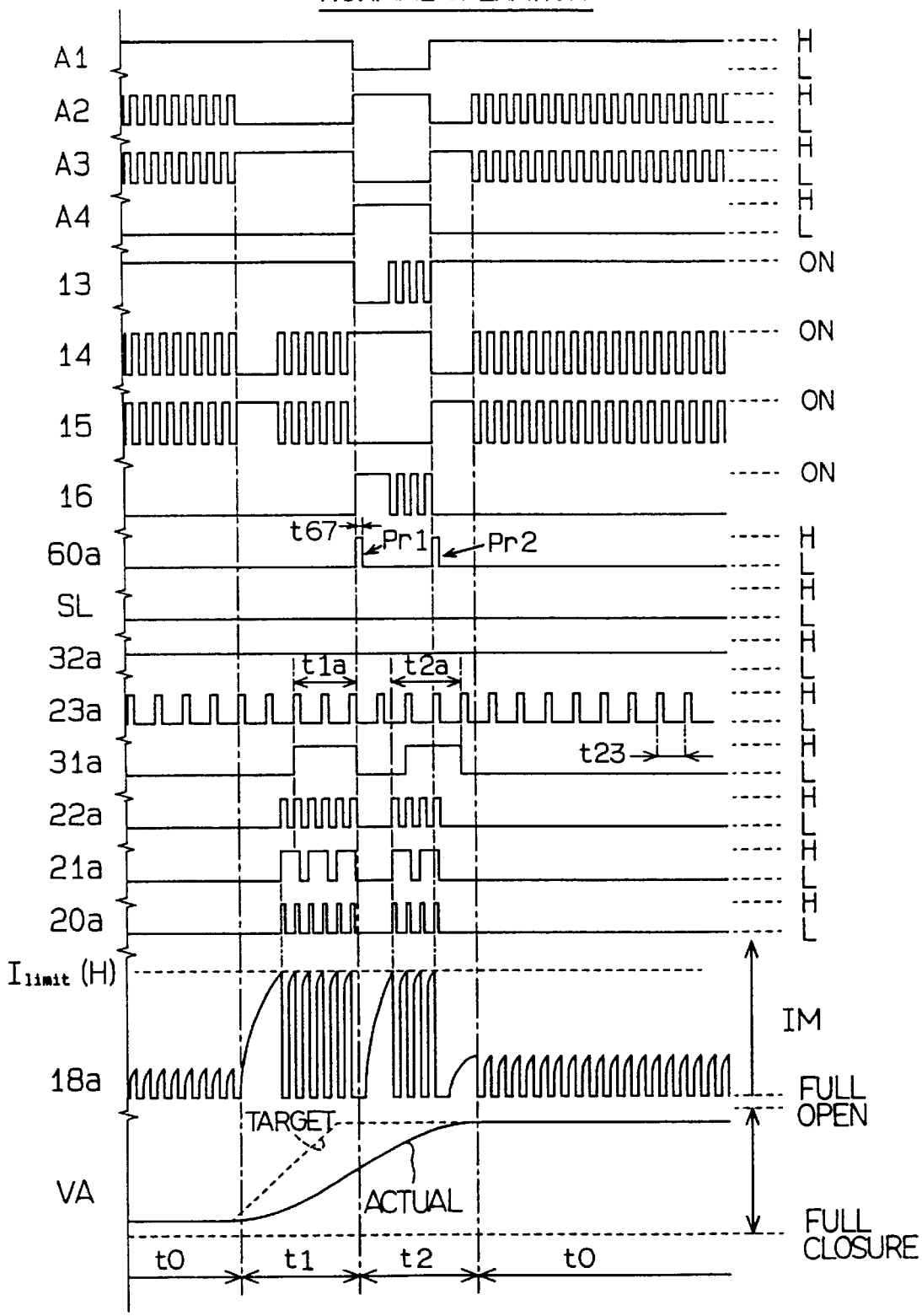
FIG. 10 is a timing diagram showing an operation of the second embodiment under the normal condition.

FIG. 10 shows an operation at the normal time. In this instance, as described with reference to FIG. 4, the current limitation operation with the current limitation value Ilimit (H) is effected during the drive initiation and braking current supply periods.

Further, when the drive command signal A4 becomes the H-level upon switching from the drive initiation current supply (period t1) to the braking current supply (period t2), the reset pulse generator circuit 60 provided in the drive circuit 9 responsively produces the reset pulse Pr1 which is at the H-level, that is, the current limitation cancellation signal, during the predetermined time period t67. The flip-flop 31 (timer 32) and the latch 33 provided in the drive circuit 9 are reset. Thus, the timer 32 counting the current limitation continuation period is reset thereby to cancel the current limitation.

In the similar manner, the current supply direction is changed at the time of ending the braking current supply so that a reset pulse Pr2 is produced.

As described above, the present embodiment has the following features.
(a) The reset pulse generator circuit 60 is provided as the cancellation means to cancel the current limitation operation on the motor by the microcomputer 8 as the current limitation means based on the drive command signals. That is, the current limitation is cancelled, when switching the direction of the current supply to the motor is detected from the drive command signal and the current supply direction is switched.

Thus, the reset pulse generator circuit 60 is provided to produce the current limitation cancellation signal (reset pulse) based on the drive command signals. Therefore, as evident from comparison of FIG. 8 and FIG. 2, the embodiment of FIG. 8 is effective to eliminate a signal line for transmitting the current limitation cancellation command signal SR in FIG. 2 while it is not in the first embodiment. Thus, the number of lines (number of signal lines) between the microcomputer 8 and the driver circuit 9.

Third Embodiment

The third embodiment is described next with reference to the difference from the first embodiment.

Figure 11:
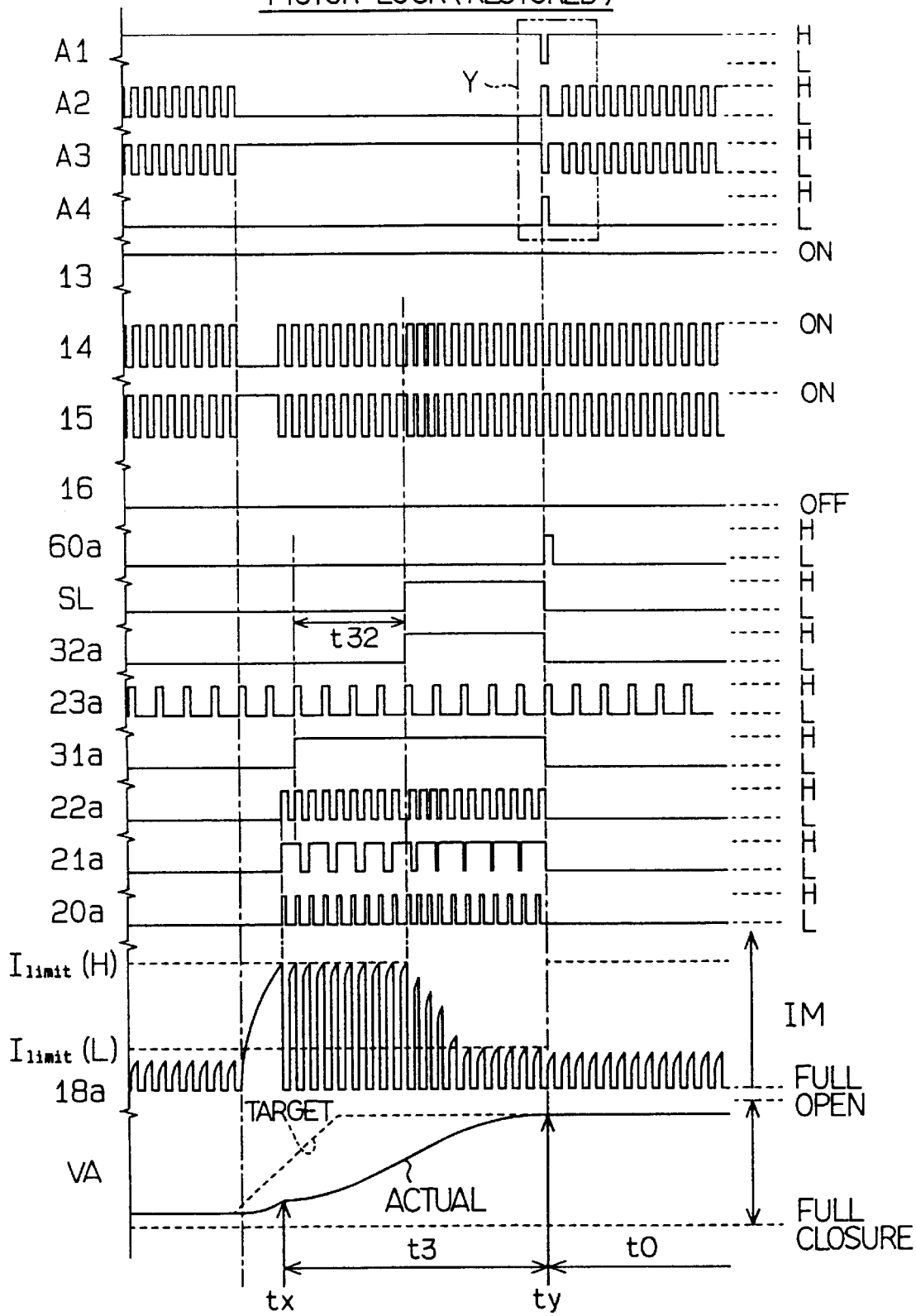
FIG. 11 is a timing diagram showing an operation of a third embodiment of the present invention under the motor lock condition.
Figure 12:
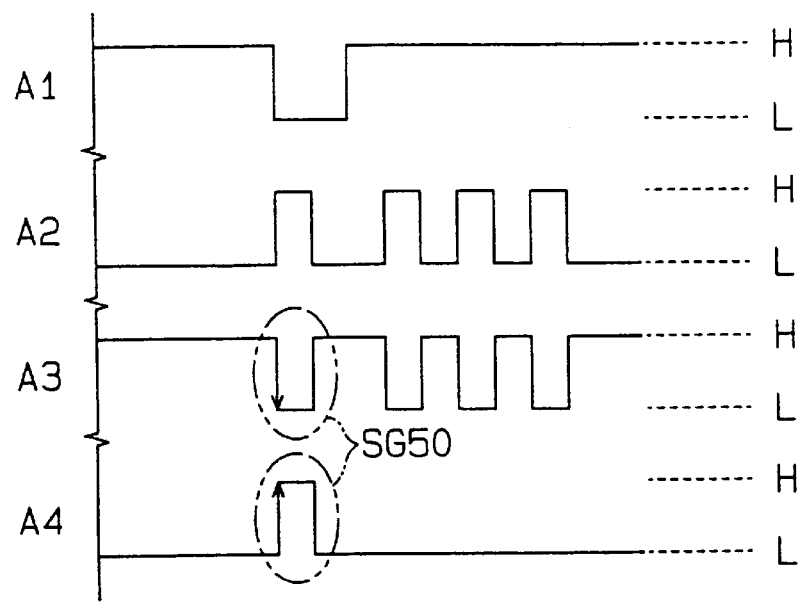
FIG. 12 is an enlarged timing diagram showing drive command signals in the third embodiment.

FIG. 11 shows a timing diagram of this embodiment. That is, FIG. 11 shows an operation under the motor lock (restored) and FIG. 12 shows an enlarged signal in the part Y in FIG. 11.

Further, the circuit construction of this embodiment is the same as that shown in FIGS. 8 and 9. The reset pulse generator circuit 60 in FIG. 9 is used to an extraction circuit which extracts the current limitation cancellation command signal superimposed on the drive command signals A3 and A4 form the microcomputer 8.

In the first embodiment, the current limitation cancellation signal SR is produced when the motor restored from its lock condition within the predetermined time period after the motor lock condition is detected and the current limitation control is effected in the motor control apparatus using the H-bridge circuit. In the third embodiment, however, as shown in FIG. 12, the drive command signals A3 and A4 are superimposed with signals (signals for reversing the direction once) SG50 and applied to the drive circuit 9.

The extraction circuit (circuit constructed in the same manner as the reset pulse generator circuit 60 in FIG. 9) which separates the signals S50 in the driver circuit 9 is provided, so that the current limitation operation may be cancelled. The process of superimposing the signals SG50 is executed by the microcomputer 8.

Thus, the signals SG50 for canceling the current limitation are superimposed in the microcomputer 8 on the drive command signals A3 and A4 applied from the microcomputer 8 to the drive circuit 9, and the extraction circuit 60 is provided in the drive circuit 9 to extract the signal SG50 for canceling the current limitation. Thus, the signal line which transmits the current limitation cancellation command signal SR in FIG. 2 is eliminated to reduce the number of lines (number of signal lines) between the microcomputer and the drive circuit 9. That is, the line exclusive to the transmission of the limitation cancellation signal can be eliminated, and the number of lines can be reduced.

Fourth Embodiment

The fourth embodiment is described next with reference to the difference from the third embodiment.

Figure 13:
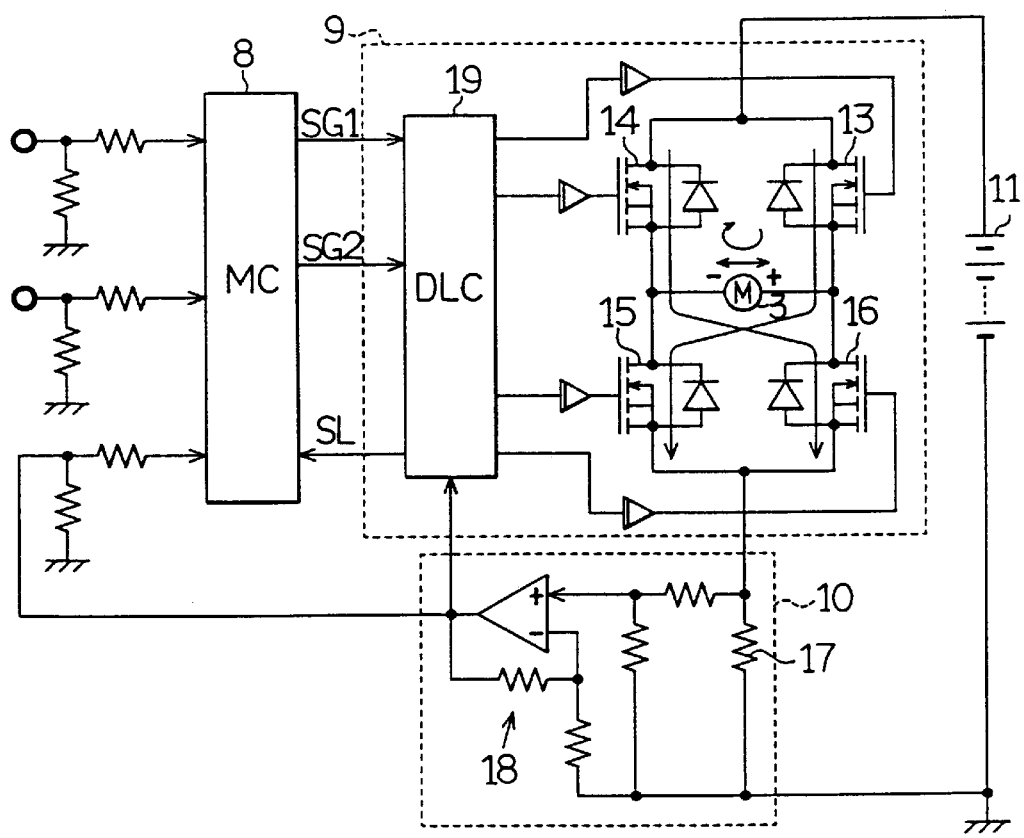
FIG. 13 is an electric circuit diagram showing the drive circuit used in a fourth embodiment of the present invention.
Figure 14:
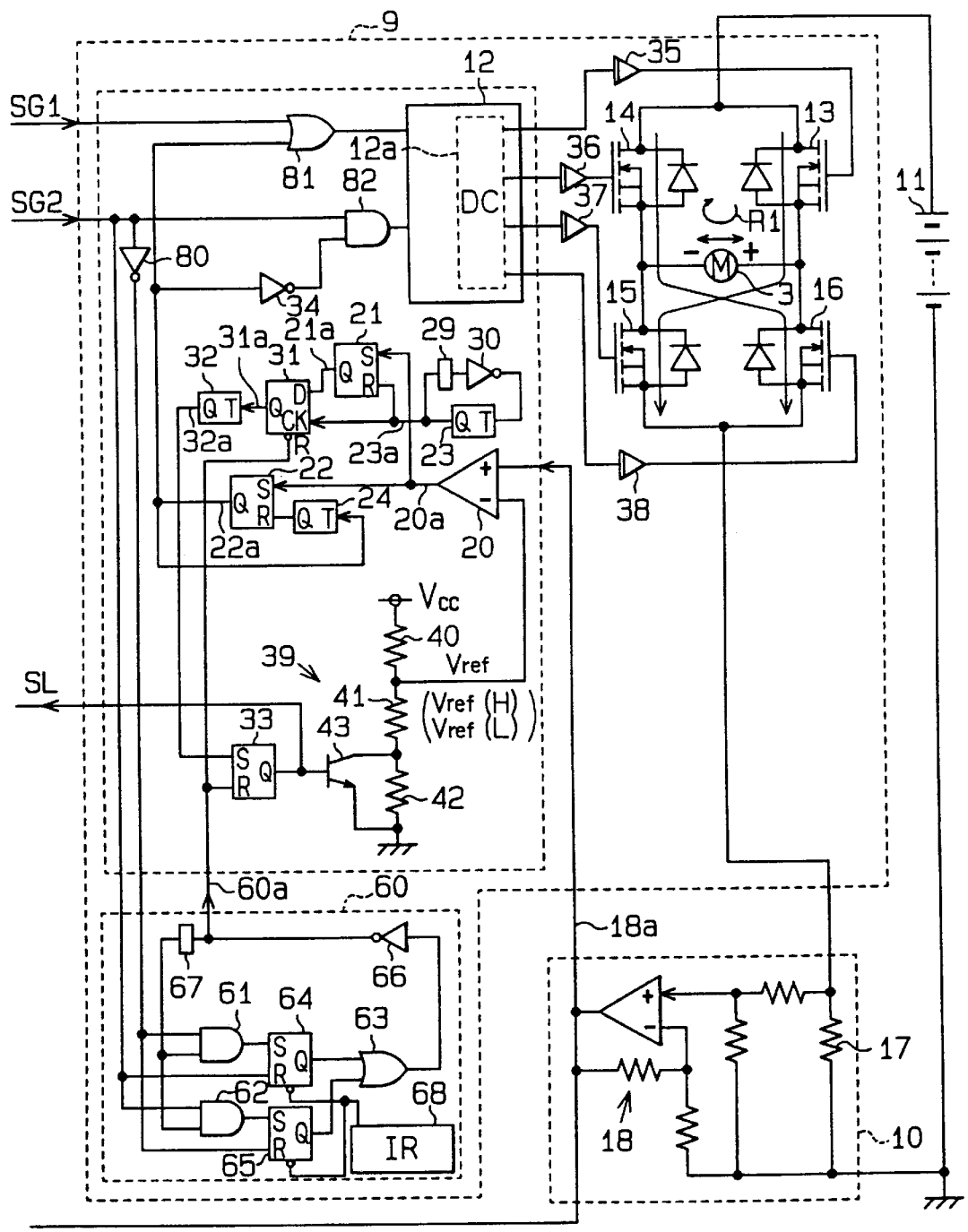
FIG. 14 is a detailed electric circuit diagram showing the drive circuit shown in FIG. 13.

FIG. 13 shows the construction of the microcomputer 8 and the drive circuit 9 according to the present embodiment, and FIG. 14 shows the details of the drive circuit 9. Further, FIG. 15 shows a timing diagram at the time of motor lock.

In FIG. 13, the microcomputer 8 applies a signal SG1 which indicates a duty ratio for a motor drive and a signal which indicates a direction of motor rotation to the drive circuit 9. As shown in FIG. 14, the protective control circuit 12 in the drive circuit 9 has a distribution circuit 12a. The distribution circuit 12a receives the signals SG1 and SG2 from the microcomputer 8 through an OR gate 81 and an AND gate 82, and produces the drive signals for the MOS-FETs 13–16. Further, in FIG. 14, the extraction circuit (circuit 60 denoted with numerals 60 in FIG. 9) is connected to the SG2 signal lines through two lines. An inverter 80 is connected in one of the lines.

Figure 15:
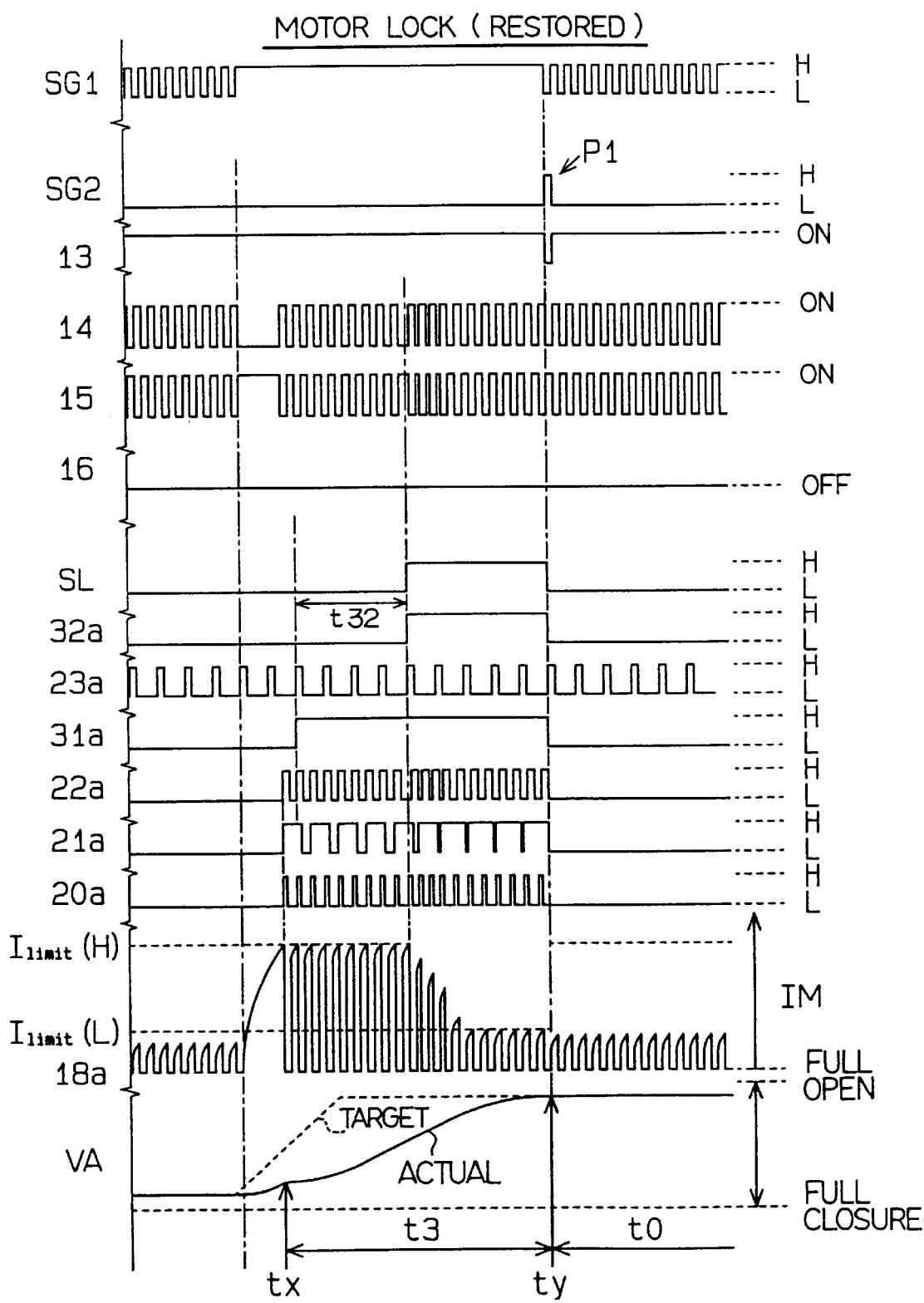
FIG. 15 is a timing diagram showing an operation of the fourth embodiment under the motor lock condition.
Figure 16:
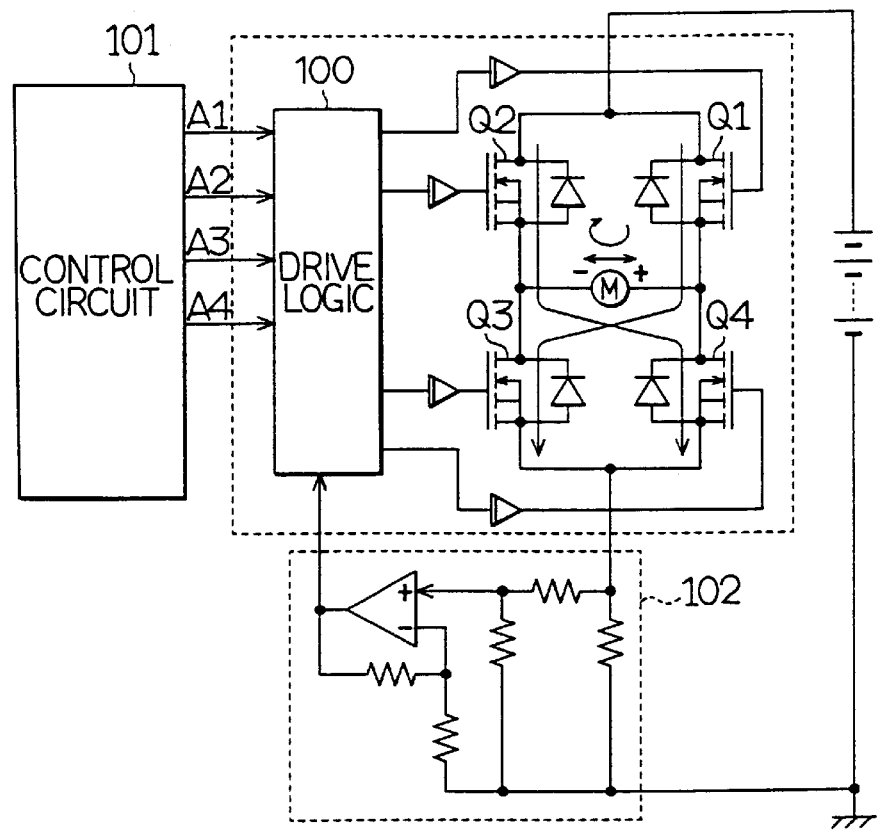
FIG. 16 is a circuit diagram showing a conventional apparatus.

As shown in FIG. 15, the microcomputer 8 superimposes a pulse P1 on the signal SG2 which indicates the direction of motor rotation. The pulse P1 is for canceling the current limitation to the motor 3 based on the position signal from the throttle angle sensor 4 under the current limitation condition. This pulse P1 is extracted in the extraction circuit 60 to cancel the current limitation operation.

Thus, the number of lines (number of signal lines) between the microcomputer 8 and the drive circuit 9 can be reduced.

The present invention should not be limited to the disclosed embodiments, but may be embodied in other ways without departing from the spirit of the invention.

What is claimed is:
1. A motor drive apparatus comprising:
a driven object which is position-controlled by a motor;
a drive circuit which supplies electric current to the motor;
position detection means which detects a position of the driven object;
control means which receives a position detection signal from the position detection means and produces a drive command signal to the drive circuit to control the position of the driven object to a target position;
current limitation means which limits the current supplied to the motor not to exceed a predetermined value within a current variation zone in a normal operation range of the motor relative to a lock condition where the driven object cannot be controlled to the target position and continues to stay at substantially the same position; and cancellation means which cancels, based on the position detection signal of the position detection means or the drive command signal, a current limitation of the current limitation means against the motor under a current limitation condition.

2. A motor drive apparatus as in claim 1, wherein the cancellation means cancels the current limitation of the current limitation means against the motor when it detects a predetermined behavior of the driven object in response to the position detection signal from the position detection means under the current limitation condition.

3. A motor drive apparatus as in claim 2, wherein the predetermined behavior of the driven object is detected from a predetermined change of the driven object.

4. A motor drive apparatus as in claim 3, wherein the predetermined change of the driven object is detected from an arrival of the driven object at a required position.

5. A motor drive apparatus as in claim 3, wherein the predetermined change of the driven object is detected from a change in position of the driven object in excess of a predetermined value.

6. A motor control apparatus as in claim 1, wherein the cancellation means cancels the current limitation of the current limitation means against the motor when a direction of the current is switched in response to a detection of a current supply direction in the drive command signal under the current limitation condition.

7. A motor control apparatus as in claim 1, further comprising:

means which superimposes a signal for a current limitation cancellation at a control means side on the drive command signal applied from the control means to the drive circuit, and extracts the signal for the current limitation cancellation at a drive circuit side.

8. A motor control apparatus as in claim 7, wherein the drive command signal for a superimposition is a signal indicative of a rotation direction.

9. A motor control method for a throttle valve of an engine comprising:

determining a target throttle angle of the throttle valve in accordance with an engine operating parameter;

driving an electric actuator coupled with the throttle valve with an electric current thereby to control the throttle valve to the target throttle angle;

detecting a lock of the electric actuator;

reducing the electric current supplied to the electric actuator to less than a maximum value of the electric current which is supplied under a normal operation of the electric actuator during the detected lock of the electric actuator; and canceling a reduction of the electric current when no lock of the throttle valve is detected.

10. A motor control method as in claim 9, further comprising:

limiting the electric current to a predetermined value which is larger than the maximum value while the electric actuator is driven to control the throttle valve to the target throttle angle;

switching the electric current from the predetermined value to the maximum value when the limitation of the electric current to the predetermined value continues for more than a first predetermined time period; and interrupting a supply of the electric current to the electric actuator when a reduction of the electric current to less than the maximum value continues for more than a second predetermined time period.

* * * * *